US011228966B2

(12) United States Patent
Abedini et al.

(10) Patent No.: US 11,228,966 B2
(45) Date of Patent: *Jan. 18, 2022

(54) REQUESTING RESOURCE ALLOCATION IN A WIRELESS BACKHAUL NETWORK

(71) Applicant: QUALCOMM Incorporated, San Diego, CA (US)

(72) Inventors: Navid Abedini, Raritan, NJ (US); Karl Georg Hampel, Hoboken, NJ (US); Junyi Li, Chester, NJ (US); Sundar Subramanian, San Diego, CA (US); Muhammad Nazmul Islam, Edison, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/988,365

(22) Filed: May 24, 2018

(65) Prior Publication Data

US 2019/0014533 A1 Jan. 10, 2019

Related U.S. Application Data

(60) Provisional application No. 62/530,708, filed on Jul. 10, 2017.

(51) Int. Cl.
H04W 48/14 (2009.01)
H04W 16/10 (2009.01)
(Continued)

(52) U.S. Cl.
CPC .......... H04W 48/14 (2013.01); H04W 16/10 (2013.01); H04W 72/0426 (2013.01);
(Continued)

(58) Field of Classification Search
CPC ..... H04W 48/14; H04W 48/08; H04W 48/00; H04W 72/0426; H04W 72/04;
(Continued)

(56) References Cited

U.S. PATENT DOCUMENTS

2006/0035675 A1* 2/2006 Karaoguz ............ H04B 7/0491
455/562.1
2010/0238826 A1* 9/2010 Borran .................. H04W 16/02
370/252
(Continued)

FOREIGN PATENT DOCUMENTS

WO   WO-2017022870 A1   2/2017

OTHER PUBLICATIONS

QUALCOMM: "Forward Compatibility Considerations on NR Integrated Access and Backhaul," 3GPP Draft; R1 -167119, 3rd Generation Partnership Project (3GPP), Mobile Competence Centre; 650, Route Des Lucioles; F-06921 Sophia-Antipolis Cedex; France, Aug. 22, 2016-Aug. 26, 2016, Aug. 13, 2016, XP051142525, 6 pages, Retrieved from the Internet: URL: http://www.3gpp.org/ftp/tsg_ran/WG1_RL1/TSGR1_86/Docs/ [retrieved on Aug. 13, 2016].
(Continued)

Primary Examiner — Jeffrey M Rutkowski
Assistant Examiner — Luna Weissberger
(74) Attorney, Agent, or Firm — Holland & Hart LLP

(57) ABSTRACT

Methods, systems, and devices for wireless communication are described. A first wireless node may establish a wireless connection between the first wireless node and a second wireless node in a wireless backhaul communications network. The first wireless node may identify, at the first wireless node, a need for additional resources for wireless communications with a third wireless node. The first wireless node may transmit a request message to the second wireless node indicating that resources are requested at the
(Continued)

first wireless node. The first wireless node may receive an indication of one or more available resources from the second wireless node. The first wireless node may select one or more of the available resources for wireless communications with the third wireless node.

30 Claims, 12 Drawing Sheets

(51) Int. Cl.
| | |
|---|---|
| *H04W 56/00* | (2009.01) |
| *H04W 72/04* | (2009.01) |
| *H04W 76/14* | (2018.01) |
| *H04W 74/00* | (2009.01) |
| H04W 72/02 | (2009.01) |
| H04W 74/08 | (2009.01) |
| H04W 92/20 | (2009.01) |

(52) U.S. Cl.
CPC ......... *H04W 74/008* (2013.01); *H04W 76/14* (2018.02); *H04W 56/001* (2013.01); *H04W 72/02* (2013.01); *H04W 72/0413* (2013.01); *H04W 74/0833* (2013.01); *H04W 92/20* (2013.01)

(58) Field of Classification Search
CPC . H04W 72/00; H04W 74/008; H04W 74/002; H04W 76/14; H04W 76/10; H04W 76/00; H04W 88/08; H04W 88/00; H04W 92/20; H04W 92/18; H04W 92/16; H04W 16/02; H04W 16/00; H04W 16/10; H04W 72/0446; H04W 72/044; H04W 56/001; H04W 56/00; H04W 72/1278; H04W 72/12; H04W 74/0833; H04W 74/08; H04W 74/00; H04W 72/0413; H04W 72/0406; H04W 72/02
USPC ........................................................ 370/329
See application file for complete search history.

(56) References Cited

U.S. PATENT DOCUMENTS

| | | | | |
|---|---|---|---|---|
| 2011/0194535 | A1* | 8/2011 | Johansson | H04W 28/24 |
| | | | | 370/331 |
| 2012/0099519 | A1* | 4/2012 | Kim | H04L 5/00 |
| | | | | 370/315 |
| 2014/0098670 | A1* | 4/2014 | Choi | H04W 28/08 |
| | | | | 370/235 |
| 2016/0205604 | A1* | 7/2016 | Kang | H04W 36/0072 |
| | | | | 370/331 |
| 2016/0353401 | A1* | 12/2016 | Tapia | H04W 24/02 |
| 2017/0331577 | A1* | 11/2017 | Parkvall | H04L 29/06231 |
| 2018/0359790 | A1* | 12/2018 | Ingale | H04W 28/16 |
| 2019/0014569 | A1 | 1/2019 | Abedini et al. | |

OTHER PUBLICATIONS

"3rd Generation Partnership Project; Technical Specification Group Radio Access Network; Study on New Radio (NR) Access Technology (Release 14)", 3GPP Draft; RP-170378 PCR for TR38.912 (V0.2.0), 3rd Generation Partnership Project (3GPP), Mobile Competence Centre ; 650, Route Des Lucioles; F-06921 Sophia-Antipolis Cedex; France, Mar. 7, 2017 (Mar. 7, 2017), XP051234097, 71 pages, Retrieved from the Internet: URL: http://www.3gpp.org/ftp/Meetings_3GPP SYNC/RAN/Docs/ [retrieved on Mar. 7, 2017].
International Search Report and Written Opinion—PCT/US2018/034688—ISA/EPO—dated Sep. 11, 2018.
Shi Z., et al., "Dynamic Resource Allocation in mmWave Unified Access and Backhaul Network", 2015 IEEE 26th Annual International Symposium on Personal, Indoor and Mobile Radio Communications (PIMRC), IEEE, Aug. 30, 2015 (Aug. 30, 2015), pp. 2260-2264, XP032822338, DOI: 10.1109/PIMRC.2015.7343674 [retrieved on Dec. 1, 2015].

* cited by examiner

REQUESTING RESOURCE ALLOCATION IN A WIRELESS BACKHAUL NETWORK

CROSS REFERENCES

The present Application for Patent claims the benefit of U.S. Provisional Patent Application No. 62/530,708 by ABEDINI, et al., entitled "REQUESTING RESOURCE ALLOCATION IN A WIRELESS BACKHAUL NETWORK," filed Jul. 10, 2017, assigned to the assignee hereof, and expressly incorporated herein.

BACKGROUND

The following relates generally to wireless communication, and more specifically to requesting resource allocation in a wireless backhaul network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may rely on backhaul networks to exchange information between nodes (e.g., between base stations and/or between a base station and a core network). The backhaul networks may be used to communicate user plane traffic and/or control plane traffic. Some backhaul networks may be wired, may be wireless, or may include a mix of wired and wireless links. A wireless backhaul network may include some or all of the wireless nodes (e.g., base stations and/or UE) being configured with an access node function (ANF) and/or a UE function (UEF) that controls, monitors, or otherwise manages aspect(s) of the wireless backhaul network. Such wireless backhaul networks may include different sets of resources (e.g., any one or combination of time, frequency, space, code, etc., resources) being allocated to different nodes. For example, a different subset of a set of resources may be allocated to different subset of nodes of the wireless backhaul network for access and/or backhaul communications. Partitioning the resources in such a manner may minimize interference, but may be costly with respect to such resources and/or may minimize which nodes are able to communicate with each other. This may delay traffic between such nodes.

SUMMARY

The described techniques relate to improved methods, systems, devices, or apparatuses that support requesting resource allocation in a wireless backhaul network. Generally, the described techniques provide a mechanism for a wireless node (e.g., user equipment (UE) and/or base station) to request additional resources to, for example, establish a connection to a joining wireless node. For example, the first wireless node may have a wireless connection with a second wireless node as part of a wireless backhaul network. The first wireless node may determine that a third wireless node is available for communications via the wireless backhaul network. The first wireless may determine which resources are needed to communicate with the third wireless node and send a request message to the second wireless node asking for more resources. The second wireless node may determine a resource configuration for the first wireless node that include available resources (e.g., any one or combination of time, frequency, space, and code) that the first wireless node can use. The second wireless node may transmit a response message that carries, conveys, or otherwise identifies the available resources. The first wireless node may select resources from the available resources and use the selected resources for communications with the third wireless node (e.g., performing an access procedure, and the like).

In some aspects, the described techniques provide a mechanism for a wireless node (e.g., user equipment (UE) and/or base station) to autonomously select and use additional resources to, for example, establish a connection to a joining wireless node. For example, the first wireless node may have a wireless connection as part of a wireless backhaul network. The first wireless node may determine that a third wireless node is available for communications via the wireless backhaul network. The first wireless may determine which resources are needed to communicate with the third wireless node and may identify and use some or all of the available resources (e.g., any one or combination of time, frequency, space, and code). Thus, the first wireless node may select resources from the available resources and use the selected resources for communications with the third wireless node (e.g., performing an access procedure, and the like). In some aspects, this may support low-latency situations, e.g., in an ultra-reliable/low-latency (URLLC) scenario.

A method of wireless communication is described. The method may include establishing a wireless connection between a first wireless node and a second wireless node in a wireless backhaul communications network, identifying, at the first wireless node, a need for additional resources for wireless communications with a third wireless node, transmitting a request message to the second wireless node indicating that resources are requested at the first wireless node, receiving an indication of one or more of the available resources from the second wireless node, and selecting one or more of the available resources for wireless communications with the third wireless node.

An apparatus for wireless communication is described. The apparatus may include means for establishing a wireless connection between a first wireless node and a second wireless node in a wireless backhaul communications network, means for identifying, at the first wireless node, a need for additional resources for wireless communications with a third wireless node, means for transmitting a request message to the second wireless node indicating that resources are requested at the first wireless node, means for receiving an indication of one or more available resources from the second wireless node, and means for selecting one or more of the available resources for wireless communications with the third wireless node.

Another apparatus for wireless communication is described. The apparatus may include a processor, memory in electronic communication with the processor, and instructions stored in the memory. The instructions may be operable to cause the processor to establish a wireless connection between a first wireless node and a second wireless node in a wireless backhaul communications network, identify, at the first wireless node, a need for additional resources for wireless communications with a third wireless node, transmit a request message to the second wireless node indicating that resources are requested at the first wireless node, receive an indication of one or more available resources from the second wireless node, and select one or more of the available resources for wireless communications with the third wireless node.

A non-transitory computer readable medium for wireless communication is described. The non-transitory computer-readable medium may include instructions operable to cause a processor to establish a wireless connection between a first wireless node and a second wireless node in a wireless backhaul communications network, identify, at the first wireless node, a need for additional resources for wireless communications with a third wireless node, transmit a request message to the second wireless node indicating that resources are requested at the first wireless node, receive an indication of one or more available resources from the second wireless node, and select one or more of the available resources for wireless communications with the third wireless node.

Some examples of the method, apparatus, and non-transitory computer-readable medium described above may further include processes, features, means, or instructions for transmitting a message to the second wireless node indicating the selected one or more of the available resources.

Some examples of the method, apparatus, and non-transitory computer-readable medium described above may further include processes, features, means, or instructions for transmitting a message to the third wireless node indicating the selected one or more of the available resources.

Some examples of the method, apparatus, and non-transitory computer-readable medium described above may further include processes, features, means, or instructions for performing an access procedure with the third wireless node using the selected one or more of the available resources.

In some examples of the method, apparatus, and non-transitory computer-readable medium described above, the access procedure comprises at least one of a synchronization procedure, a random access procedure, a paging procedure, a system information procedure, a reference signal procedure, or any combination thereof. In some examples of the method, apparatus, and non-transitory computer-readable medium described above, the paging procedure comprises identifying a paging occasion associated with a target wireless node, wherein the selected one or more of the available resources is based at least in part on the paging occasion.

In some examples of the method, apparatus, and non-transitory computer-readable medium described above, the synchronization procedure comprises communicating synchronization signals or communicating on a synchronization channel.

In some examples of the method, apparatus, and non-transitory computer-readable medium described above, the random access procedure comprises communicating at least one of a random access channel (RACH) message 1, a RACH message 2, a RACH message 3, or a RACH message 4.

In some examples of the method, apparatus, and non-transitory computer-readable medium described above, the system information procedure comprises communicating at least one of a master information block (MIB), a system information block (SIB), or a minimum system information (minSI).

In some examples of the method, apparatus, and non-transitory computer-readable medium described above, the reference signal procedure comprises communicating at least one of a channel state information reference signal (CSI-RS) or a beamform reference signal (BRS).

Some examples of the method, apparatus, and non-transitory computer-readable medium described above may further include processes, features, means, or instructions for receiving a RACH preamble message from the third wireless node, wherein the request message may be transmitted in response to receiving the RACH preamble message. Some examples of the method, apparatus, and non-transitory computer-readable medium described above may further include processes, features, means, or instructions for transmitting a random access response (RAR) message using the resources selected from the one or more available resources.

Some examples of the method, apparatus, and non-transitory computer-readable medium described above may further include processes, features, means, or instructions for receiving at least one of a synchronization signal, a reference signal, a system information signal, or any combination thereof, wherein the request message may be transmitted in response to receiving the synchronization signal, the reference signal, the system information signal, or any combination thereof. Some examples of the method, apparatus, and non-transitory computer-readable medium described above may further include processes, features, means, or instructions for transmitting a RACH preamble message using the resources selected from the one or more available resources.

Some examples of the method, apparatus, and non-transitory computer-readable medium described above may further include processes, features, means, or instructions for establishing a wireless communication backhaul link with the third wireless node using the resources selected from the one or more available resources.

Some examples of the method, apparatus, and non-transitory computer-readable medium described above may further include processes, features, means, or instructions for determining that the third wireless node may be available for multiple-user multiple-input/multiple-output (MU-MIMO) wireless communications. Some examples of the method, apparatus, and non-transitory computer-readable medium described above may further include processes, features, means, or instructions for performing MU-MIMO wireless communications with the third wireless node using the additional resources.

Some examples of the method, apparatus, and non-transitory computer-readable medium described above may further include processes, features, means, or instructions for configuring the request message to convey an indication of the requested resources.

In some examples of the method, apparatus, and non-transitory computer-readable medium described above, the requested resources comprise a resource available at the first wireless node.

In some examples of the method, apparatus, and non-transitory computer-readable medium described above, the requested resources comprise a subset of resources from an available set of resources at the first wireless node.

Some examples of the method, apparatus, and non-transitory computer-readable medium described above may further include processes, features, means, or instructions for identifying the requested resources based on at least one of a resource schedule of a plurality of wireless nodes, a capability configuration of the plurality of wireless nodes, a communication requirement of the plurality of wireless nodes, a signal received from the plurality of wireless nodes, a channel state information or beam measurement corresponding to the plurality of wireless nodes, or any combination thereof.

In some examples of the method, apparatus, and non-transitory computer-readable medium described above, the plurality of wireless nodes comprises any combination of the first wireless node, the third wireless node, and a fourth wireless node.

In some examples of the method, apparatus, and non-transitory computer-readable medium described above, the capability configuration comprises at least one of a radio frequency (RF) or digital processing capability, an antenna subarray configuration, a full-duplex capability, a spatial division multiplexing (SDM) capability, a beam correspondence capability, or any combination thereof.

In some examples of the method, apparatus, and non-transitory computer-readable medium described above, the request message comprises information associated with at least one of a resource schedule of a plurality of wireless nodes, a capability configuration of the plurality of wireless nodes, a communication requirement of the plurality of wireless nodes a signal received from the plurality of wireless nodes, a channel state information or beam measurement corresponding to the plurality of wireless nodes, or any combination thereof.

In some examples of the method, apparatus, and non-transitory computer-readable medium described above, the requested resources comprise a periodic resource.

In some examples of the method, apparatus, and non-transitory computer-readable medium described above, the requested resources comprise a resource associated with a time interval.

In some examples of the method, apparatus, and non-transitory computer-readable medium described above, the requested resource comprises at least one of a user-plane resource, a control-plane resource, or any combination thereof.

In some examples of the method, apparatus, and non-transitory computer-readable medium described above, one or more available resources comprise a time division multiplexing resource, a frequency division multiplexing resource, a code division multiplexing resource, a space division multiplexing resource, or any combination thereof.

In some examples of the method, apparatus, and non-transitory computer-readable medium described above, each of the first wireless node, the second wireless node, and the third wireless node comprises a base station.

In some examples of the method, apparatus, and non-transitory computer-readable medium described above, the plurality of wireless nodes comprises any combination of the first wireless node, the third wireless node, and a fourth wireless node 25.

In some examples of the method, apparatus, and non-transitory computer-readable medium described above, the second wireless node comprises a base station and each of the first wireless node and third wireless node comprises at least one of a base station or a UE.

In some examples of the method, apparatus, and non-transitory computer-readable medium described above, the wireless backhaul communication network comprises a millimeter wave (mmW) band network.

A method of wireless communication is described. The method may include establishing a wireless connection between a first wireless node and a second wireless node in a wireless backhaul communication network, receiving a request message from the first wireless node indicating that resources are requested at the first wireless node to communicate with a third wireless node, identifying a resource configuration including one or more available resources available for the first wireless node, and transmitting an indication of the one or more available resources to the first wireless node.

An apparatus for wireless communication is described. The apparatus may include means for establishing a wireless connection between a first wireless node and a second wireless node in a wireless backhaul communication network, means for receiving a request message from the first wireless node indicating that resources are requested at the first wireless node to communicate with a third wireless node, means for identifying a resource configuration including one or more available resources available for the first wireless node, and means for transmitting an indication of the one or more available resources to the first wireless node.

Another apparatus for wireless communication is described. The apparatus may include a processor, memory in electronic communication with the processor, and instructions stored in the memory. The instructions may be operable to cause the processor to establish a wireless connection between a first wireless node and a second wireless node in a wireless backhaul communication network, receive a request message from the first wireless node indicating that resources are requested at the first wireless node to communicate with a third wireless node, identify a resource configuration including one or more available resources available for the first wireless node, and transmit an indication of the one or more available resources to the first wireless node.

A non-transitory computer readable medium for wireless communication is described. The non-transitory computer-readable medium may include instructions operable to cause a processor to establish a wireless connection between a first wireless node and a second wireless node in a wireless backhaul communication network, receive a request message from the first wireless node indicating that resources are requested at the first wireless node to communicate with a third wireless node, identify a resource configuration including one or more available resources available for the first wireless node, and transmit an indication of the one or more available resources to the first wireless node.

Some examples of the method, apparatus, and non-transitory computer-readable medium described above may further include processes, features, means, or instructions for coordinating with one or more other wireless nodes to identify the resource configuration.

Some examples of the method, apparatus, and non-transitory computer-readable medium described above may further include processes, features, means, or instructions for coordinating with central scheduler of a core network to identify the resource configuration.

In some examples of the method, apparatus, and non-transitory computer-readable medium described above, the resource configuration may be identified based on at least one of a resource schedule of a plurality of wireless nodes, a capability configuration of the plurality of wireless nodes, a communication requirement of the plurality of wireless nodes, a signal received from the plurality of wireless nodes, a channel state information or beam measurement corresponding to the plurality of wireless nodes, or any combination thereof.

In some examples of the method, apparatus, and non-transitory computer-readable medium described above, the plurality of wireless nodes comprise any combination of the first wireless node, the second wireless node, the third wireless node, and a fourth wireless node.

DETAILED DESCRIPTION

In some wireless communications systems, a wireless node may typically enjoy a robust wireline link to a network entity that coordinates aspects of backhaul communications (e.g., the network entity provides timing information, cell identity, etc.) for neighboring nodes to coordinate backhaul transmissions. Wireless nodes operating in millimeter wave (mmW) frequency ranges may be associated with a reduced coverage area (e.g., a smaller geographic footprint, directional transmissions, etc.), which may result in a deployment of a larger number of access nodes (e.g., wireless nodes) to provide acceptable coverage areas to users. As a result, a number of wireless nodes within the wireless communication system may not be coupled with a wireline backhaul link and may instead use wireless backhaul links for backhaul communications in a wireless backhaul network. However, such a dense deployment of mmW access nodes may be affected by inefficient resource allocation in the absence of techniques that provide coherent wireless resource allocation and scheduling.

Aspects of the disclosure are initially described in the context of a wireless communications system. Generally, aspects of the described techniques provide for resource requests between nodes of a wireless backhaul network. For example, two wireless nodes of the wireless backhaul network may have a connection used for access and/or backhaul communications in the wireless backhaul network. A first of the wireless nodes may determine or otherwise identify a third wireless node that the first wireless node does not have a connection with. The third node may or may not already have connection(s) to other wireless nodes of the wireless backhaul network. The first wireless node may determine which resource(s) are needed to establish a connection (or otherwise communicate with) the third wireless node and transmit a resource request message to a second wireless node (e.g., a wireless node with an access node function (ANF) that is connected to the first wireless node). The resource request message may carry or otherwise indicate which resources are being requested (e.g., a specific set of resources are requested or any resources are being requested). The second wireless node may determine or otherwise identify a resource configuration that includes available resource(s) that can be used by the first wireless node. The second wireless node may transmit a response message to the first wireless node identifying or otherwise conveying an indication of the available resources. The first wireless node may select resources from the available resources and use the selected resources for communications with the third wireless node.

Aspects of the disclosure are further illustrated by and described with reference to apparatus diagrams, system diagrams, and flowcharts that relate to requesting resource allocation in a wireless backhaul network.

Figure 1:
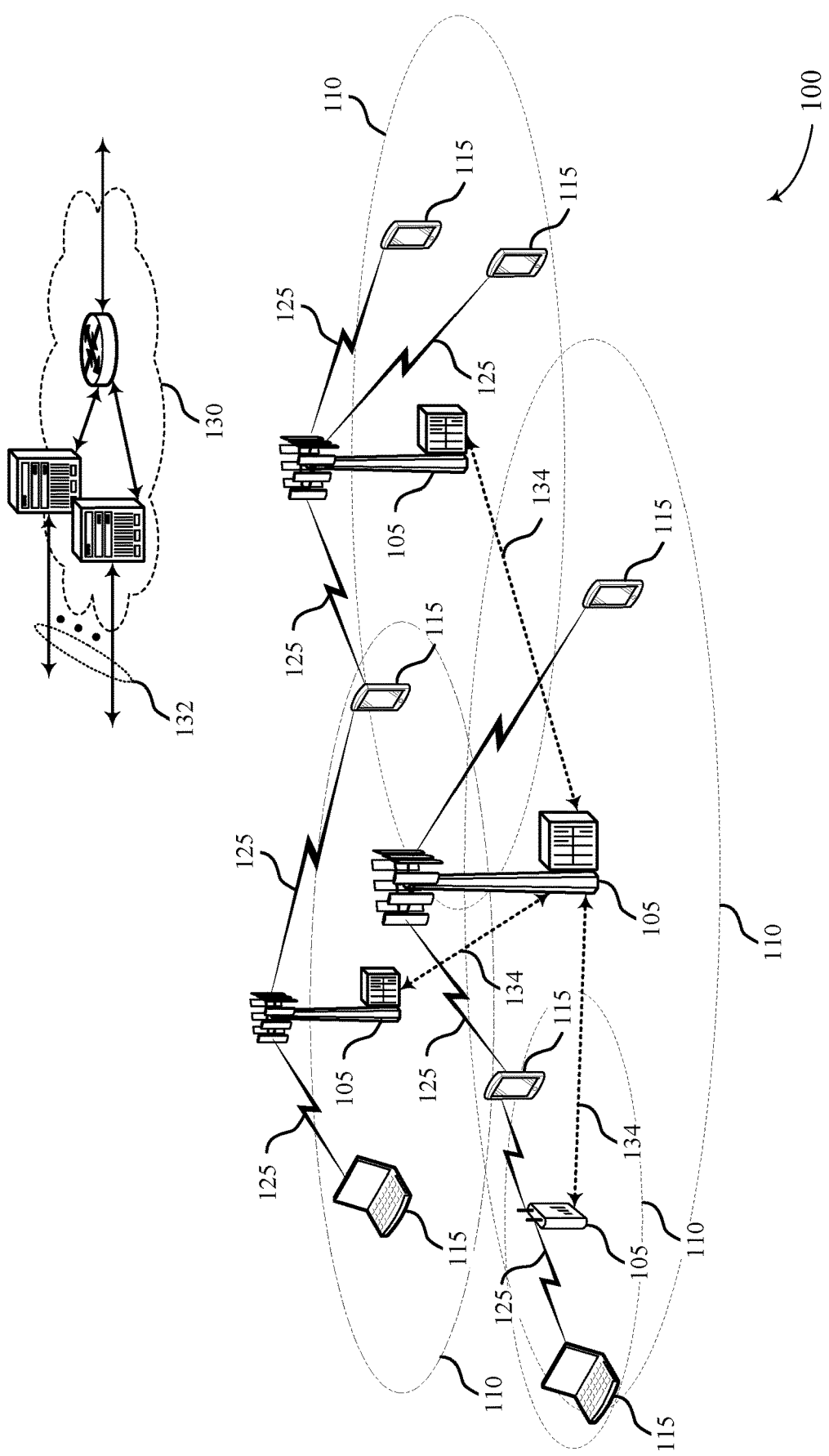
FIG. 1 illustrates an example of a system for wireless communication that supports requesting resource allocation in a wireless backhaul network in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service. In some aspects, the base station 105 may be connected to the core network 130 (either directly or indirectly) via a wireless backhaul network.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, cellular radio access technologies (RATs), such as mmW-based RATs, may be used to support access traffic between UEs 115 and base stations 105, in addition to backhaul and access traffic among multiple base stations 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments.

Thus, using a mmW RAT may enable wireless backhaul communication using one or more node functions at a wireless node, such as a base station 105, an access node, or UE 115. Additionally, multiple wireless nodes may communicate in a backhaul network using a schedule that is aligned with a frame structure. For example, a wireless node (e.g., UE 115 and/or base station 105) may establish a link with different wireless nodes (e.g., UE 115 and/or base station 105) using a RAT that supports a synchronized frame structure, such as a mmW RAT. The wireless node may identify a need for additional resources for wireless communications with a third wireless node. The wireless node may transmit a request message to a second wireless node indicating that resources are requested at the first wireless node. The second wireless node may identify a resource configuration, based on the request message, that includes available resource(s) for the wireless node. The wireless node may receiving an indication of one or more available resources from the second wireless node. The wireless node may select one or more of the available resources for wireless communications with the third wireless node.

Figure 2:
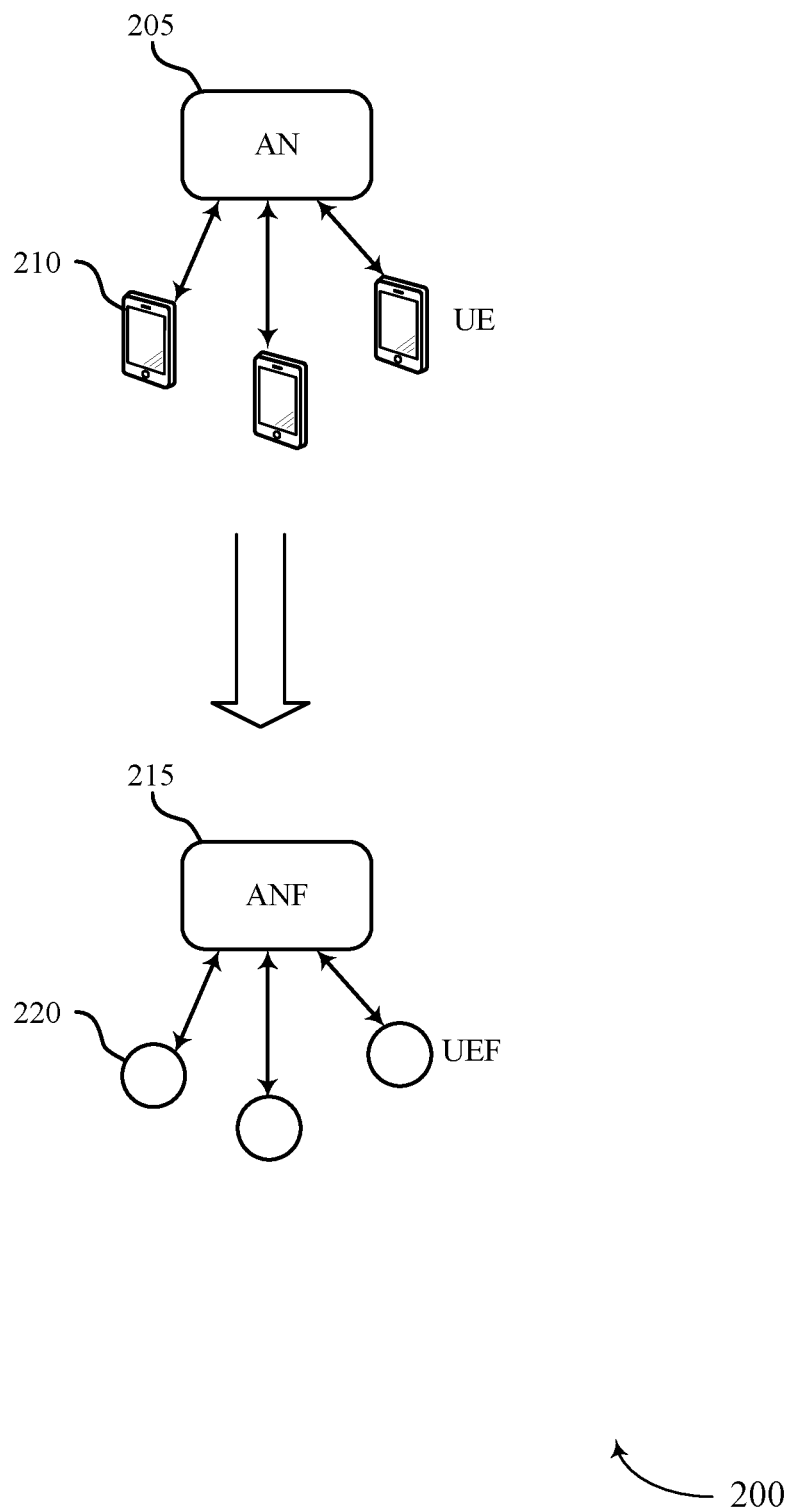
FIG. 2 illustrates an example of a backhaul network that supports requesting resource allocation in a wireless backhaul network in accordance with aspects of the present disclosure.

FIG. 2 illustrates an example of a backhaul network 200 that supports requesting resource allocation in a wireless backhaul network in accordance with various aspects of the present disclosure. In some examples, backhaul network 200 may implement aspects of wireless communication system 100. Backhaul network 200 may include an access node 205, a plurality of UEs 210, an access node function (ANF) 215, and a plurality of UE functions (UEF) 220, which may be examples of the corresponding devices described herein. That is, AN 205, UE 210, ANF 215, and/or UEF 220 may be examples of a UE 115 and/or base station 105, as described herein. An access node 205 and/or UE 210 may also be an example of a wireless node, as described herein.

In backhaul network 200, a number of access nodes 205 (one being shown for clarity) may be interconnected via communication links (e.g., backhaul links) and thus form a given topology with respect to access nodes 205. In such cases, the access node 205 may instantiate one or more node functions to coordinate signaling and resource allocation between the access node 205 and the UEs 210. For example, the access nodes 205 may instantiate one or more ANFs 215, one or more UEFs 220, or any combination thereof.

Access node 205 may be located at a central point of a star, and may be connected to a wireline backhaul link (e.g., an optical fiber cable) to a core network. In some cases, access node 205 may be the only access node in backhaul network 200 that is connected to the wireline backhaul link. Access node 205 may instantiate an ANF 215, and the nodes at the leaves of the star (e.g., UEs 210) may each instantiate a UEF 220. Access node 205 may then communicate with UEs 210 using communication link(s) using the node functions. In some cases, the communication link may be associated with a set of resources that are partitioned into subsets of partitioned resources. The subsets of partitioned resources may be allocated to subsets of the nodes of the backhaul network 200.

The ANFs 215 and the UEFs 220 may be assigned the same functionalities and signaling protocols for resource allocation as defined by a RAT. That is, resource coordination of a backhaul star can be managed via the RAT, such as a mmW RAT. Furthermore, wireless resource use among access nodes 205 within a star may be coordinated via a large-scale (e.g., network-wide) schedule. Within each star, signaling and resource management may be regulated by the RAT and a resource sub-schedule may be generated by a star's ANF (such as the ANF 215 instantiated at access node 205).

In some examples, access node 205 and/or UE 210 may instantiate an ANF 215 in addition to the UEF 220. Access node 205 may accordingly communicate with neighboring access node(s) using communication link according to the node functions.

In some cases, ANFs 215 may support transmission of a downlink control channel, reception of an uplink control channel, scheduling of downlink and uplink data transmission within a resource space assigned to a link or to a set of links, transmission of synchronization signals and cell reference signals (e.g., as a primary synchronization symbol (PSS) or secondary synchronization symbol (SSS) on a synchronization channel), transmitting beam sweeps, and transmitting downlink beam change requests. Additionally, UEFs 220 may support reception of a downlink control channel, transmission of a uplink control channel, requesting scheduling of uplink data transmissions, transmission of random access preambles on a random access channel, listening to beam sweeps and reporting beam indexes and beam signal strength detected, and executing downlink beam change requests. In some cases, there may be other features that differentiate the ANF 215 and the UEF 220 implemented at a node. As described above, an access node 205 may implement a combination of one or more node functions, such as multiple ANFs 215, multiple UEFs 220, or combinations thereof.

In some aspects, a wireless node (e.g., a UE 210 and/or access node 205) may identify a new wireless node (e.g., the third wireless node) that is available for communications with the wireless node. The wireless node may identify which resource(s) are needed to communicate with the new wireless node and send a request message to a second wireless node (e.g., a request message from a UE 210 to access node 205) requesting the needed resources. The second wireless node may receive a response message indicating which resource(s) are available and select resources from the available resources to use for communicating with the new wireless node.

In some aspects, a wireless node (e.g., a UE 210 and/or access node 205) may identify a new wireless node (e.g., the third wireless node) that is available for communications with the wireless node. The wireless node may identify which resource(s) are needed to communicate with the new wireless node and begin using the resources without sending a request message to a second wireless node (e.g., a request message from a UE 210 to access node 205) requesting the needed resources. Instead, the wireless node may begin using the resources without the handshaking procedure (e.g., message exchange with the second wireless node). The wireless node may select resources from the available resources and use them for communicating with the new wireless node.

Figure 3:
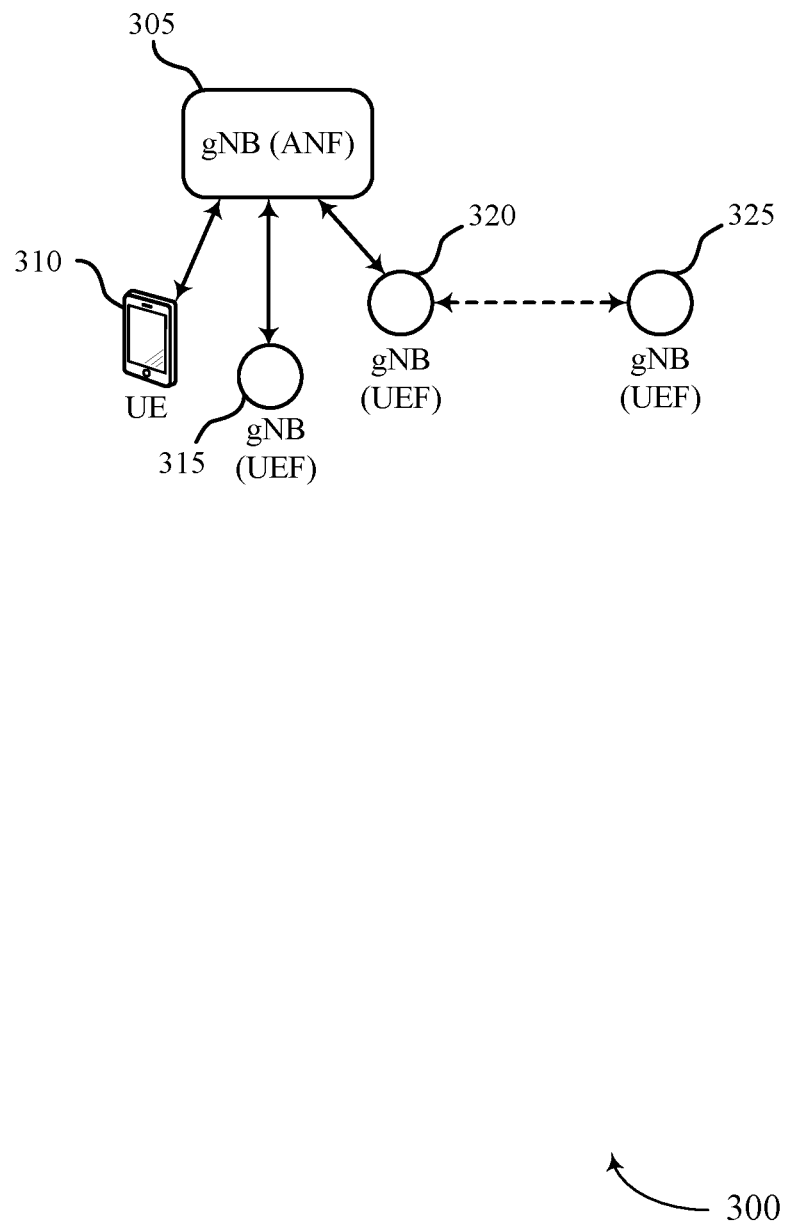
FIG. 3 illustrates an example of a backhaul network that supports requesting resource allocation in a wireless backhaul network in accordance with aspects of the present disclosure.

FIG. 3 illustrates an example of a backhaul network 300 that supports requesting resource allocation in a wireless backhaul network in accordance with various aspects of the present disclosure. In some examples, backhaul network 300 may implement aspects of wireless communication system 100 and/or backhaul network 200. Backhaul network 300 may include wireless nodes 305, 310, 315, 320, and 325, which may be examples of the corresponding devices described herein. For example, any of wireless nodes 305, 310, 315, 320, and/or 325 may be examples of a UE 115 and/or base station 105 when configured for communications in a wireless backhaul network. The backhaul network 300 may include a mmW wireless backhaul network, in some examples.

In some aspects, wireless nodes 305, 315, 320, and/or 325 may be examples of a base station (e.g., a gNB) that includes an ANF and/or a UEF that manages aspect(s) of communications between wireless nodes 305, 315, and/or 320. In some aspects, wireless node 305 may have a wireless connection with wireless nodes 310, 315, and/or 320 as a part of backhaul network 300. Wireless node 310 may be an example of a wireless node configured to communicate with wireless node 305 utilizing conventional mmW RAT protocols. Wireless node 325 may be an example of a wireless node that does not, at least initially, have a wireless connection with wireless node 320 as part of the wireless backhaul network. However, wireless node 320 may detect wireless node 325 (e.g., monitor one or more signals and/or messages received from wireless node 325) and determine that wireless node 325 is available for communications. In this context, wireless node 305 may be considered a second wireless node, wireless node 320 may be considered a first wireless node, and wireless node 325 may be considered a third wireless node.

Base on detecting wireless node 325, wireless node 320 may identify or otherwise determine which resource(s) are needed for wireless node 320 to communicate with wireless node 325 (e.g., resources to perform an access procedure, and the like). The needed resources may include one or any combination of a time resource, a frequency resource, a space resource (e.g., beamforming configuration), and/or a code resource. Accordingly, wireless node 320 may transmit a request message to wireless node 305 that identifies or otherwise conveys an indication of the requested resources that wireless node 320 needs to communicate with wireless node 325. Wireless node 305 (e.g., the ANF) may receive the request message from wireless node 320 and identify a resource configuration that includes some or all resources that are available for wireless node 320 to use for communicating with wireless node 325.

Wireless node 305 may configure and transmit a response message to wireless node 320 that carries or otherwise conveys an indication of the available resources. Wireless node 320 may receive the indication of the available resources and select resources to use for communicating with wireless node 325. In some aspects, wireless node 320 may transmit a message to either or both of wireless node 305 and wireless node 320 that indicates which resources of the available resources have been selected by wireless node 320. Wireless node 320 may use the selected resources to communicate with wireless node 325, e.g., to perform an access procedure, to perform access and/or backhaul communications, and the like.

In some aspects, the UEF of wireless node 320 may request the additional resources from ANF of wireless node 305. That is, ANF of wireless node 305 may manage aspects of scheduling and allocation of resources for associated UEF(s). Accordingly, UEF of wireless node 320 may manage aspect(s) of identifying and requesting the additional resources from wireless node 305 (or rather ANF of wireless node 305).

In one example, UEF of wireless node 320 may want to communicate with one or more other nodes (e.g., wireless node 325) as part of an access procedure. The access procedure may include transmitting (Tx) and/or receiving (Rx) any of: synchronization signals or synchronization channels; random access procedure messages (e.g., random access channel (RACH) preamble (RACH message1), random access response (RAR) (RACH message 2), RACH message 3, and/or RACH message 4; beam reference signals (e.g., CSI-RS, BRS, etc.); system information (e.g., MIB, minSI, other SI). This may correspond to communications over any combination of access or backhaul links of the wireless backhaul network. For example, the UEF of wireless node 320 may have received a RACH preamble from wireless node 325 and wants to transmit a RAR. Upon receiving the RACH preamble, UEF of wireless node 320 may request its ANF (e.g., ANF of wireless node 305) for some resources to use to transmit the RAR. In another example, the UEF of wireless node 320 may have received synchronization or beam reference signal(s) from wireless node 325 and wants to transmit RACH preamble. The UEF of wireless node 320 may determine resources (time/frequency/beam/code) to transmit the RACH preamble, and request its ANF (e.g., the ANF of wireless node 305) for such resources, e.g., the UEF may not be able to communicate with ANF during such resources and need to notify/get a permission from ANF.

In another example, the UEF of wireless node 320 may want to establish a connection with wireless node 325 (e.g., after discovering each other thru an access procedure) for further communications. The UEF of wireless node 320 may request for some additional resources for this new link. The request may be for periodic and/or aperiodic resources. The UEF of wireless node 320 may become a new ANF of the new link with wireless node 325 and may use the allocated resources to coordinate its communication with the new node, e.g., wireless node 325. In this case, the ANF of wireless node 305 and/or wireless node 320 may allocate a subset of resources (available to ANF) to UEF of wireless node 325. In some examples, the ANF of wireless node 305 and/or 320 may allocate new resources (at least partially different from the resources available to ANF). The allocation of resources may come from a central scheduler (e.g., from the core network), or locally thru coordination and signaling with other wireless nodes in the backhaul network 300.

In another example, the resource request may be to enable MU-MIMO at the UEF of wireless node 320. That is, the UEF of wireless node 320 may have the capability and configuration to have simultaneous communications with multiple other wireless nodes (e.g., using different antenna subarrays or antenna ports). In some aspects, the ANF of wireless node 305 may or may not be part of the multiple other nodes. In some aspects, the other wireless node(s) may or may not be part of the same star (i.e. UEFs of the same ANF of wireless node 305).

In some aspects, UEF of wireless node 320 may request any resources or for some resources within a specific set of resources, e.g., particular resource(s). The request may be for periodic resources, or resources for some limited time duration. The UEF of wireless node 320 may determine the specific set of resources based on any combination of a number of factors. One factor may include the resource schedule of wireless node 320 and/or the resource schedule of other wireless nodes (e.g. including those node(s) it wants to communicate with, e.g., wireless node 325). Another factor may include the capability of wireless node 320 and/or the capability of other wireless nodes it wants to communicate with. Another factor may include a radio frequency (RF) or digital processing capabilities, antenna subarray configuration, full-duplex or half-duplex capability, capability to support SDM of two or more links, the beam correspondence capability, etc. Another factor may include the communication demand of wireless node 320 and/or the communication demand of other wireless nodes, e.g., the amount of data wireless node 320 needs to transmit. Another factor may include the received signals from other wireless nodes, e.g., after receiving RACH preamble, the UEF of wireless node 320 may request for some specific resources to transmit an RAR. Another example may include after receiving synchronization or beam reference signals from wireless node 325, UEF of wireless node 320 may request for some specific resources within which it wants to transmit RACH preamble to the wireless node 325. Generally, the request message may include or otherwise indicate any of the above factors and/or information.

In some aspects, the requested resources may be for data (U-plane) and/or control (C-plane) communications. The requested and allocated resources may refer to any combination of time, frequency, code, and space resource. The resource allocation may involve any combination of TDM, FDM, CDM, SDM.

In some aspects, ANF of wireless node 305 may receive one or multiple requests, determines a resource configuration, and may transmit a signal to the UEF(s) indicating the resource configuration. The determination may be to accept or reject a request for a set of resources. The determination may be to assign a set of resources. The determination may involve coordination and signal exchange with one or multiple other wireless nodes. The determination may come from a central scheduler (for example in the core network). The determination may be based on the information provided in the requests and/or the capability and/or schedule of UEF(s), ANF(s), and/or other wireless nodes.

In some aspects, UEF of wireless node 320 may, upon receiving the signaling from ANF of wireless node 305 indicating the resource configuration, either accept, reject, or partially use the allocated resources. The UEF of wireless node 320 may transmit a signal to ANF of wireless node 305 and/or any other wireless nodes indicating its decision with regards to the selected resources.

Figure 4:
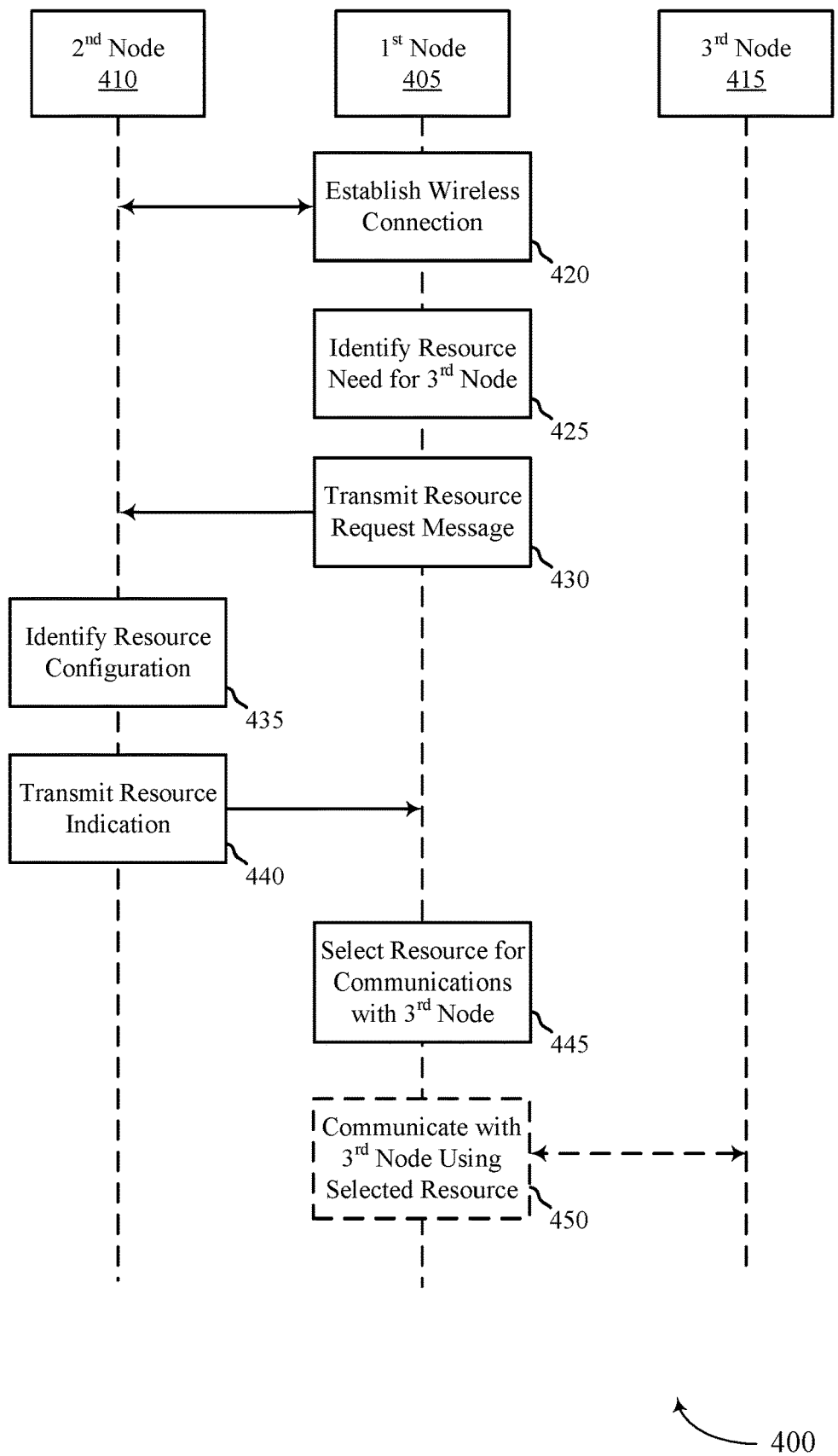
FIG. 4 illustrates an example of a process that supports requesting resource allocation in a wireless backhaul network in accordance with aspects of the present disclosure.

FIG. 4 illustrates an example of a process 400 that supports requesting resource allocation in a wireless backhaul network in accordance with various aspects of the present disclosure. In some examples, process 400 may implement aspects of wireless communication system 100 and/or backhaul networks 200/300. Process 400 may include a first wireless node 405, a second wireless node 410, and a third wireless node 415, which may be examples of the corresponding devices described herein, e.g., a UE and/or a base station. That is, in some examples each of the first wireless node 405, the second wireless node 410, and the third wireless node 415 may be examples of a base station. In some examples, each of the first wireless node 405, the second wireless node 410, and the third wireless node 415 may be examples of a UE. In some examples, the second wireless node 410 may be an example of a base station and the first wireless node 405 and/or third wireless node 415 may be either a base station or a UE.

At 420, the first wireless node 405 and the second wireless node 410 may establish a connection in a wireless backhaul network. The connection may be established by a ANF and/or UEF configured on first wireless node 405 and/or second wireless node 410. The wireless backhaul network may include a mmW band network.

At 425, the first wireless node 405 may identify resources needed for wireless communications with third wireless node 415. In some aspects, the needed resource(s) may include a TDM resource, a FDM resource, a CDM resource, and/or a SDM resource, either alone or in any combination.

At 430, the first wireless node 405 may transmit (and second wireless node 410 may receive) a request message that indicates that resources are requested at first wireless node 405.

In some aspects, the first wireless node 405 may configure the request message to convey an indication of the requested resources. The requested resources may include any resource available at the second wireless node 410. The requested resources may include a subset of resources from an available set of resources at the second wireless node 410. In some aspects, the first wireless node 405 may identify the requested resources based on at least one of a resource schedule of a plurality of wireless nodes, a capability configuration of the plurality of wireless nodes, a communication requirement of the plurality of wireless nodes, a signal received from the plurality of wireless nodes, and/or a channel state information or beam measurement corresponding to the plurality of wireless nodes, either alone or in any combination. In some aspects, the plurality of wireless nodes may include any combination of the first wireless node 405, the third wireless node 415, and a fourth wireless node.

In some aspects, the capability configuration may include a radio frequency (RF) or digital processing capability, an antenna subarray configuration, a full-duplex capability, a spatial division multiplexing (SDM) capability, and/or a beam correspondence capability, either alone or in any combination. The requested resources may include a periodic resource. The requested resources may include a resource associated with a time interval. The requested resource may include a user-plane resource and/or a control-plane resource.

In some aspects, the request message may include information associated with at least one of a resource schedule of a plurality of wireless nodes, a capability configuration of the plurality of wireless nodes, a communication requirement of the plurality of wireless nodes a signal received from the plurality of wireless nodes, and/or a channel state information or beam measurement corresponding to the plurality of wireless nodes, either alone or in any combination. The plurality of wireless nodes may include any combination of the first wireless node 405, the third wireless node 415, and/or a fourth wireless node In some aspects, the additional resources requested by and/or allocated to the first wireless node 405 may be periodic resources. Accordingly, the first wireless node 405 may establish a wireless communication backhaul or access link with the third wireless node 415 using the resources selected from the available resource(s).

At 435, the second wireless node 410 may identify a resource configuration that includes available resource(s) available for first wireless node 405. In some aspects, the second wireless node 410 may coordinate with one or more other wireless nodes to identify the resource configuration. In some aspects, the second wireless node 410 may coordinate with a central scheduler of a core network to identify the resource configuration.

In some aspects, the resource configuration may be identified based on a resource schedule of a plurality of wireless nodes, a capability configuration of the plurality of wireless nodes, a communication requirement of the plurality of wireless nodes, a signal received from the plurality of wireless nodes, and/or a channel state information or beam measurement corresponding to the plurality of wireless nodes, either alone or in any combination. The plurality of wireless nodes may include any combination of the first wireless node 405, the second wireless node 410, the third wireless node 415, and/or a fourth wireless node, either alone or in any combination.

At 440, the second wireless node 410 may transmit (and first wireless node 405 may receive) an indication of the resources of the available resource(s) for the first wireless node 405.

At 445, the first wireless node 405 may select a resource from the available resource(s) for wireless communications with the third wireless node 415. In some aspects, the first wireless node 405 may transmit an indication to the second wireless node 410 and/or the third wireless node 415 of which resource(s) were selected from the available resources.

At 450, the first wireless node 405 and the third wireless node 415 may optionally communicate using the selected resource(s). In some aspects, the communications may include the first wireless node 405 may perform an access procedure with the third wireless node 415. The access procedure may include, but is not limited to, a synchronization procedure, a random access procedure, a paging procedure, a system information procedure, and/or a reference signal procedure, either alone or in any combination. In some aspects, the paging procedure comprises identifying a paging occasion associated with a target wireless node, wherein, the selected one or more of the available resources is based at least in part on the paging occasion.

In some aspects, the synchronization procedure may include communicating synchronization signals and/or synchronization channel(s) between the first wireless node 405 and the third wireless node 415. In some aspects, the random access procedure may include communicating at least one of a RACH message 1, a RACH message 2, a RACH message 3, and/or a RACH message 4. In some aspects, the system information procedure may include communicating a MIB, a SIB, and/or a minSI. In some aspects, the reference signal procedure may include communicating a channel state or beam reference signal like a CSI-RS and/or a BRS. In some aspects, the paging procedure comprises identifying a paging occasion associated with a target wireless node, wherein, the selected one or more of the available resources is based at least in part on the paging occasion.

In some aspects, the communications may include the first wireless node 405 receiving a RACH preamble message from the third wireless node. The request message may be transmitted in response to receiving the RACH preamble message. The first wireless node 405 may transmit a RAR message using the resources selected from the available resource(s).

In some aspects, the communications may include the first wireless node 405 receiving a synchronization signal, a reference signal, and/or a system information signal, alone or in any combination. The request message may be transmitted in response to receiving the synchronization signal, the reference signal, and/or the system information signal, alone or in any combination. The first wireless node 405 may transmit a RACH preamble message using the resources selected from the available resource(s).

In some aspects, the first wireless node 405 may determine that the third wireless node 415 is available for MU-MIMO wireless communications. The first wireless node 405 may perform MU-MIMO wireless communications with the third wireless node 415 using the additional resources.

Figure 5:
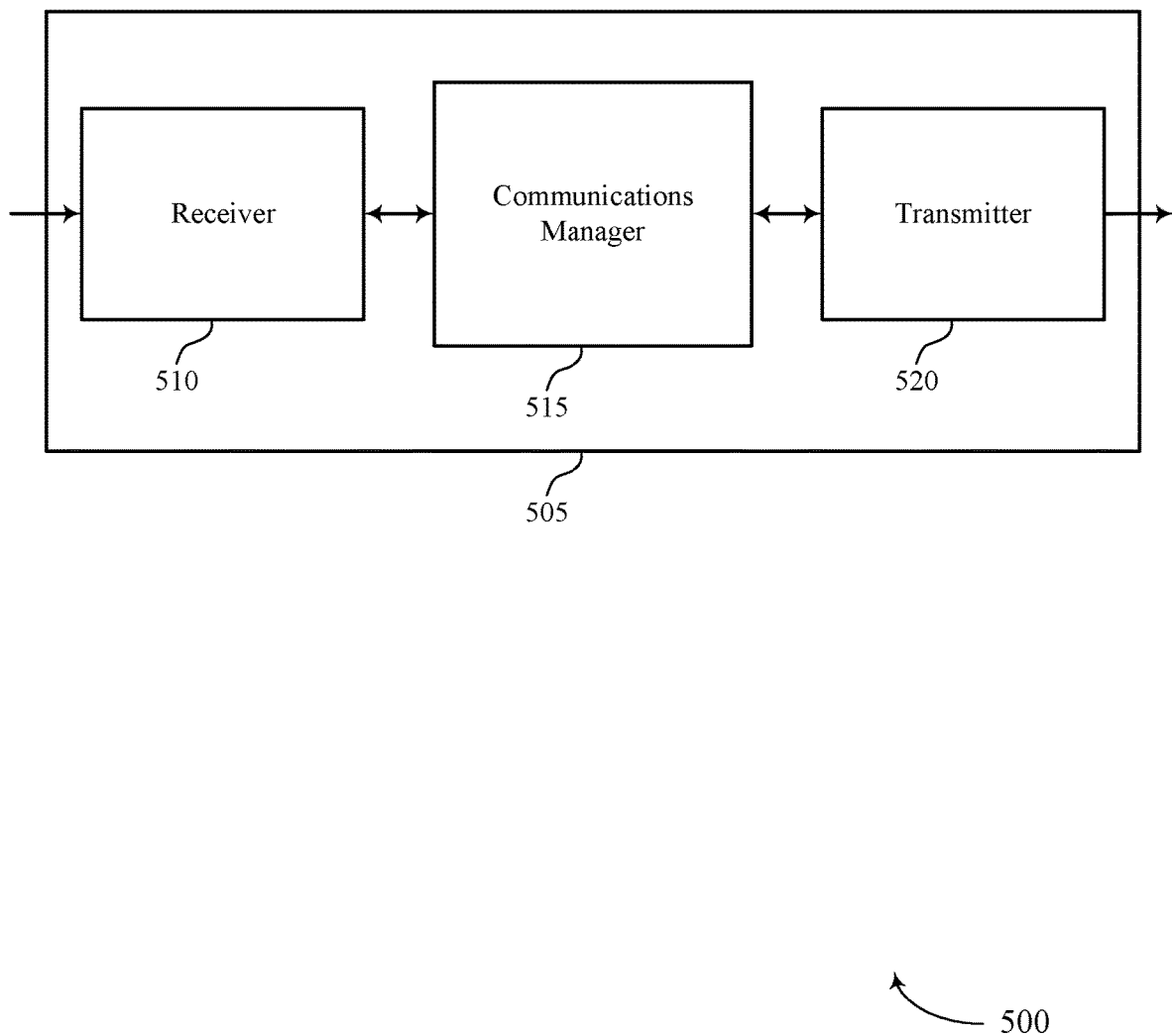
FIGS. 5 through 7 show block diagrams of a device that supports requesting resource allocation in a wireless backhaul network in accordance with aspects of the present disclosure.

FIG. 5 shows a block diagram 500 of a wireless device 505 that supports requesting resource allocation in a wireless backhaul network in accordance with aspects of the present disclosure. Wireless device 505 may be an example of aspects of a UE 115 or base station 105 or a wireless node, as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to requesting resource allocation in a wireless backhaul network, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the communications manager 815 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, communications manager 515 may establish a wireless connection between a first wireless node and a second wireless node in a wireless backhaul communications network. Communications manager 515 may identify, at the first wireless node, a need for additional resources for wireless communications with a third wireless node. Communications manager 515 may transmit a request message to the second wireless node indicating that resources are requested at the first wireless node. Communications manager 515 may receive an indication of one or more available resources from the second wireless node. Communications manager 515 may select one or more of the available resources for wireless communications with the third wireless node.

In some aspects, communications manager 515 may also establish a wireless connection between a first wireless node and a second wireless node in a wireless backhaul communication network. Communications manager 515 may receive a request message from the first wireless node indicating that resources are requested at the first wireless node to communicate with a third wireless node. Communications manager 515 may identify a resource configuration including one or more available resources available for the first wireless node. Communications manager 515 may transmit an indication of the one or more available resources to the first wireless node.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
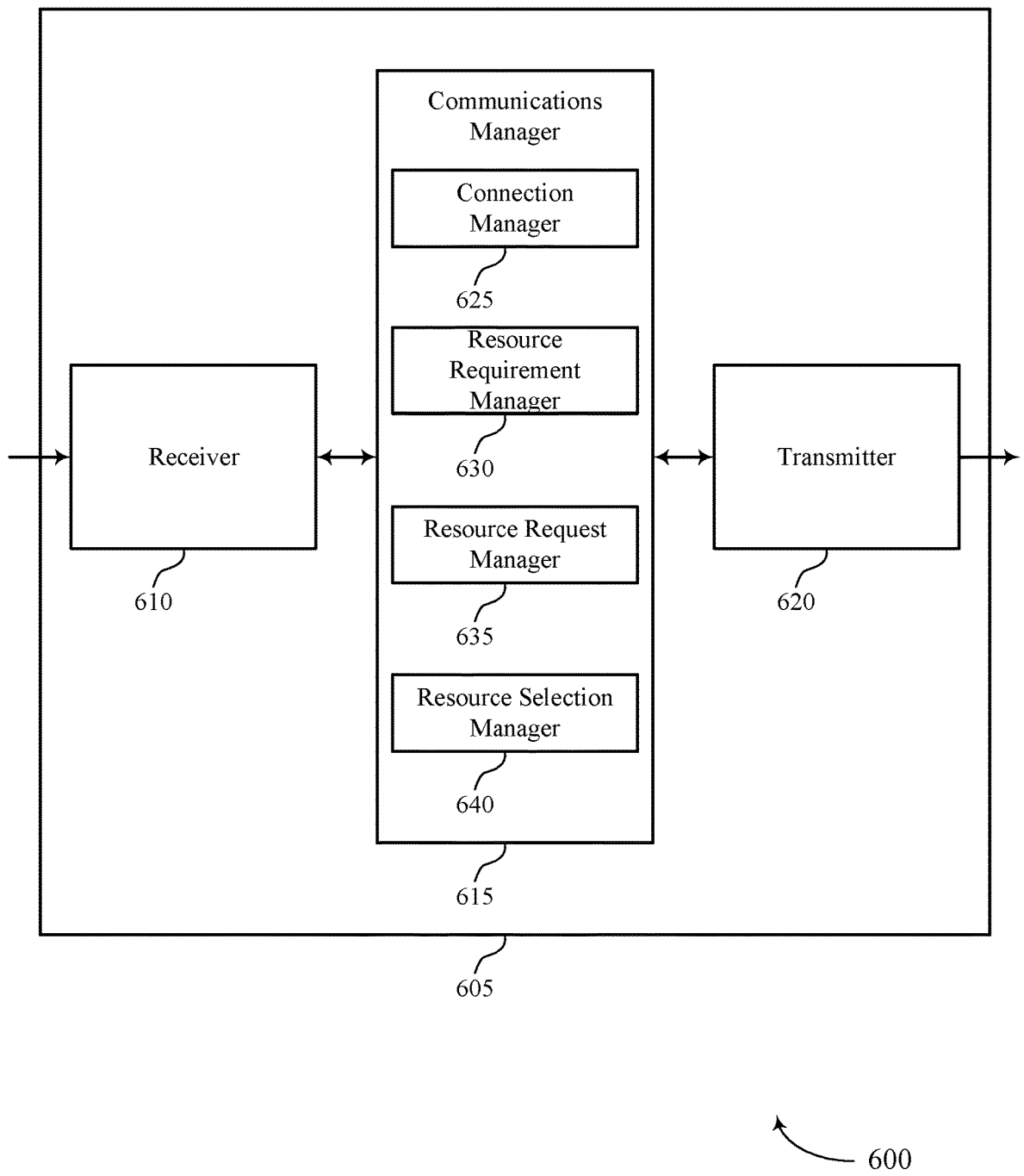

FIG. 6 shows a block diagram 600 of a wireless device 605 that supports requesting resource allocation in a wireless backhaul network in accordance with aspects of the present disclosure. Wireless device 605 may be an example of aspects of a wireless device 505 or a UE 115 or base station 105 or a wireless node, as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to requesting resource allocation in a wireless backhaul network, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the communications manager 815 described with reference to FIG. 8. Communications manager 615 may also include connection manager 625, resource requirement manager 630, resource request manager 635, and resource selection manager 640.

Connection manager 625 may establish a wireless connection between a first wireless node and a second wireless node in a wireless backhaul communications network. Connection manager 625 may establish a wireless communication backhaul link with the third wireless node using the resources selected from the one or more available resources. Connection manager 625 may establish a wireless connection between a first wireless node and a second wireless node in a wireless backhaul communication network. In some cases, each of the first wireless node, the second wireless node, and the third wireless node includes a base station. In some cases, the set of wireless nodes includes any combination of the first wireless node, the third wireless node, and a fourth wireless node. In some cases, the second wireless node includes a base station and each of the first wireless node and third wireless node includes at least one of a base station or a UE. In some cases, the wireless backhaul communication network includes a mmW band network.

Resource requirement manager 630 may identify, at the first wireless node, a need for additional resources for wireless communications with a third wireless node. In some cases, one or more available resources include a time division multiplexing resource, a frequency division multiplexing resource, a code division multiplexing resource, a space division multiplexing resource, or any combination thereof.

Resource request manager 635 may transmit a request message to the second wireless node indicating that resources are requested at the first wireless node. Resource request manager 635 may receive an indication of one or more available resources from the second wireless node. Resource request manager 635 may receive a request message from the first wireless node indicating that resources are requested at the first wireless node to communicate with a third wireless node. Resource request manager 635 may identify a resource configuration including one or more available resources available for the first wireless node. Resource request manager 635 may transmit an indication of the one or more available resources to the first wireless node.

Resource selection manager 640 may select one or more of the available resources for wireless communications with the third wireless node.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
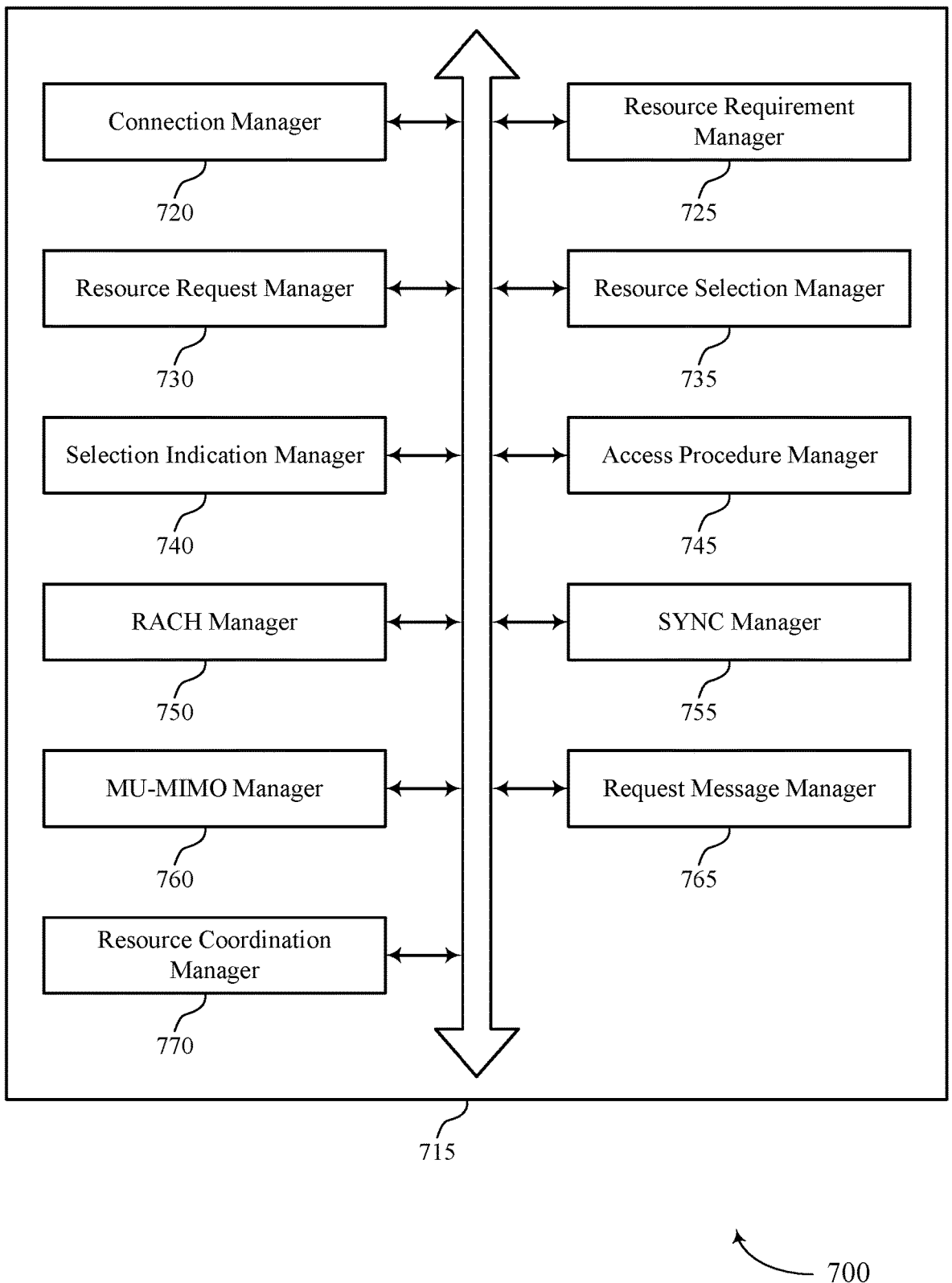

FIG. 7 shows a block diagram 700 of a communications manager 715 that supports requesting resource allocation in a wireless backhaul network in accordance with aspects of the present disclosure. The communications manager 715 may be an example of aspects of a communications manager 515, a communications manager 615, or a communications manager 815 described with reference to FIGS. 5, 6, and 8. The communications manager 715 may include connection manager 720, resource requirement manager 725, resource request manager 730, resource selection manager 735, selection indication manager 740, access procedure manager 745, random access channel (RACH) manager 750, SYNC manager 755, MU-MIMO manager 760, request message manager 765, and resource coordination manager 770. Each of these modules may communicate, directly or indirectly, with one another (e.g., via one or more buses).

Connection manager 720 may establish a wireless connection between a first wireless node and a second wireless node in a wireless backhaul communications network. Connection manager 720 may establish a wireless communication backhaul link with the third wireless node using the resources selected from the one or more available resources. Connection manager 720 may establish a wireless connection between a first wireless node and a second wireless node in a wireless backhaul communication network. In some cases, each of the first wireless node, the second wireless node, and the third wireless node includes a base station. In some cases, the set of wireless nodes includes any combination of the first wireless node, the third wireless node, and a fourth wireless node. In some cases, the second wireless node includes a base station and each of the first wireless node and third wireless node includes at least one of a base station or a UE. In some cases, the wireless backhaul communication network includes a mmW band network.

Resource requirement manager 725 may identify, at the first wireless node, a need for additional resources for wireless communications with a third wireless node. In some cases, one or more available resources include a time division multiplexing resource, a frequency division multiplexing resource, a code division multiplexing resource, a space division multiplexing resource, or any combination thereof.

Resource request manager 730 may transmit a request message to the second wireless node indicating that resources are requested at the first wireless node. Resource request manager 730 may receive an indication of one or more available resources from the second wireless node. Resource request manager 730 may receive a request message from the first wireless node indicating that resources are requested at the first wireless node to communicate with a third wireless node. Resource request manager 730 may identify a resource configuration including one or more available resources available for the first wireless node. Resource request manager 730 may transmit an indication of the one or more available resources to the first wireless node.

Resource selection manager 735 may select one or more of the available resources for wireless communications with the third wireless node. Selection indication manager 740 may transmit a message to the second wireless node indicating the selected one or more of the available resources and transmit a message to the third wireless node indicating the selected one or more of the available resources.

Access procedure manager 745 may perform an access procedure with the third wireless node using the selected one or more of the available resources. In some cases, the access procedure includes at least one of a synchronization procedure, a random access procedure, a paging procedure, a system information procedure, a reference signal procedure, or any combination thereof. In some cases, the synchronization procedure includes communicating synchronization signals or communicating on a synchronization channel. In some cases, the random access procedure includes communicating at least one of a RACH message 1, a RACH message 2, a RACH message 3, or a RACH message 4. In some cases, the system information procedure includes communicating at least one of a MIB, a SIB, or a minSI. In some cases, the reference signal procedure includes communicating at least one of a channel state or beam reference signal like a CSI-RS or a BRS.

RACH manager 750 may receive a RACH preamble message from the third wireless node, where the request message is transmitted in response to receiving the RACH preamble message. RACH manager 750 may transmit a RAR message using the resources selected from the one or more available resources.

SYNC manager 755 may receive at least one of a synchronization signal, a reference signal, a system information signal, or any combination thereof, where the request message is transmitted in response to receiving the synchronization signal, the reference signal, the system information signal, or any combination thereof. SYNC manager 755 may transmit a RACH preamble message using the resources selected from the one or more available resources.

MU-MIMO manager 760 may determine that the third wireless node is available for MU-MIMO wireless communications and perform MU-MIMO wireless communications with the third wireless node using the additional resources.

Request message manager 765 may configure the request message to convey an indication of the requested resources. Request message manager 765 may identify the requested resources based on at least one of a resource schedule of a set of wireless nodes, a capability configuration of the set of wireless nodes, a communication requirement of the set of wireless nodes, a signal received from the set of wireless nodes, a channel state information corresponding to the set of wireless nodes, or any combination thereof. In some cases, the requested resources include any resource available at the first wireless node. In some cases, the requested resources include a subset of resources from an available set of resources at the first wireless node. In some cases, the set of wireless nodes includes any combination of the first wireless node, the third wireless node, and a fourth wireless node. In some cases, the capability configuration includes at least one of a RF or digital processing capability, an antenna subarray configuration, a full-duplex capability, a SDM capability, a beam correspondence capability, or any combination thereof. In some cases, the request message includes information associated with at least one of a resource schedule of a set of wireless nodes, a capability configuration of the set of wireless nodes, a communication requirement of the set of wireless nodes a signal received from the set of wireless nodes, a channel state information corresponding to the set of wireless nodes, or any combination thereof. In some cases, the requested resources include a periodic resource. In some cases, the requested resources include a resource associated with a time interval. In some cases, the requested resource includes at least one of a user-plane resource, a control-plane resource, or any combination thereof.

Resource coordination manager 770 may coordinate with one or more other wireless nodes to identify the resource configuration. Resource coordination manager 770 may coordinate with central scheduler of a core network to identify the resource configuration. In some cases, the resource configuration is identified based on at least one of a resource schedule of a set of wireless nodes, a capability configuration of the set of wireless nodes, a communication requirement of the set of wireless nodes, a signal received from the set of wireless nodes, a channel state information corresponding to the set of wireless nodes, or any combination thereof. In some cases, the set of wireless nodes include any combination of the first wireless node, the second wireless node, the third wireless node, and a fourth wireless node.

Figure 8:
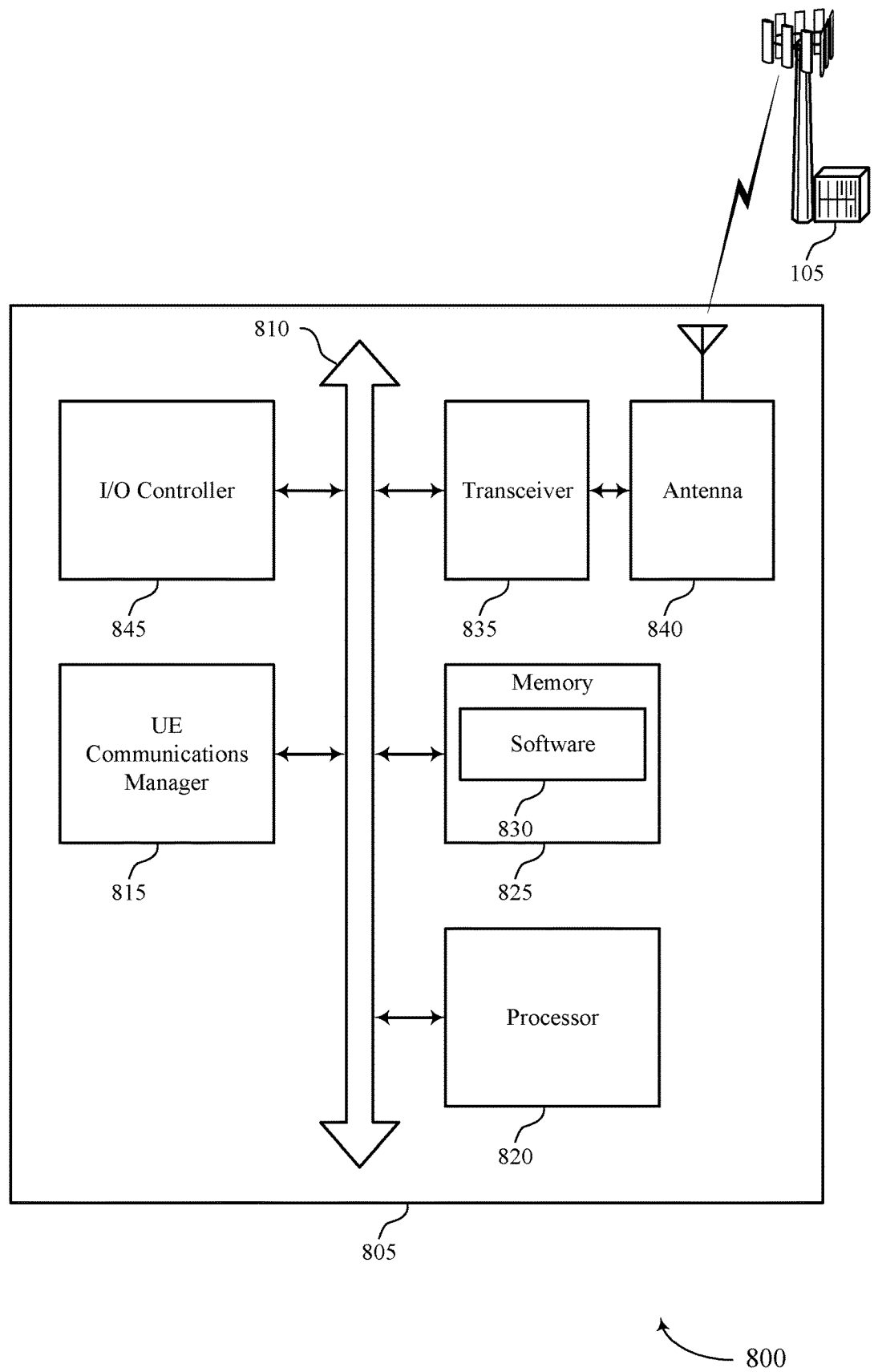
FIG. 8 illustrates a block diagram of a system including a UE that supports requesting resource allocation in a wireless backhaul network in accordance with aspects of the present disclosure.

FIG. 8 shows a diagram of a system 800 including a device 805 that supports requesting resource allocation in a wireless backhaul network in accordance with aspects of the present disclosure. Device 805 may be an example of or include the components of wireless device 505, wireless device 605, a wireless node, or a UE 115 as described herein. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting requesting resource allocation in a wireless backhaul network).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support requesting resource allocation in a wireless backhaul network. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
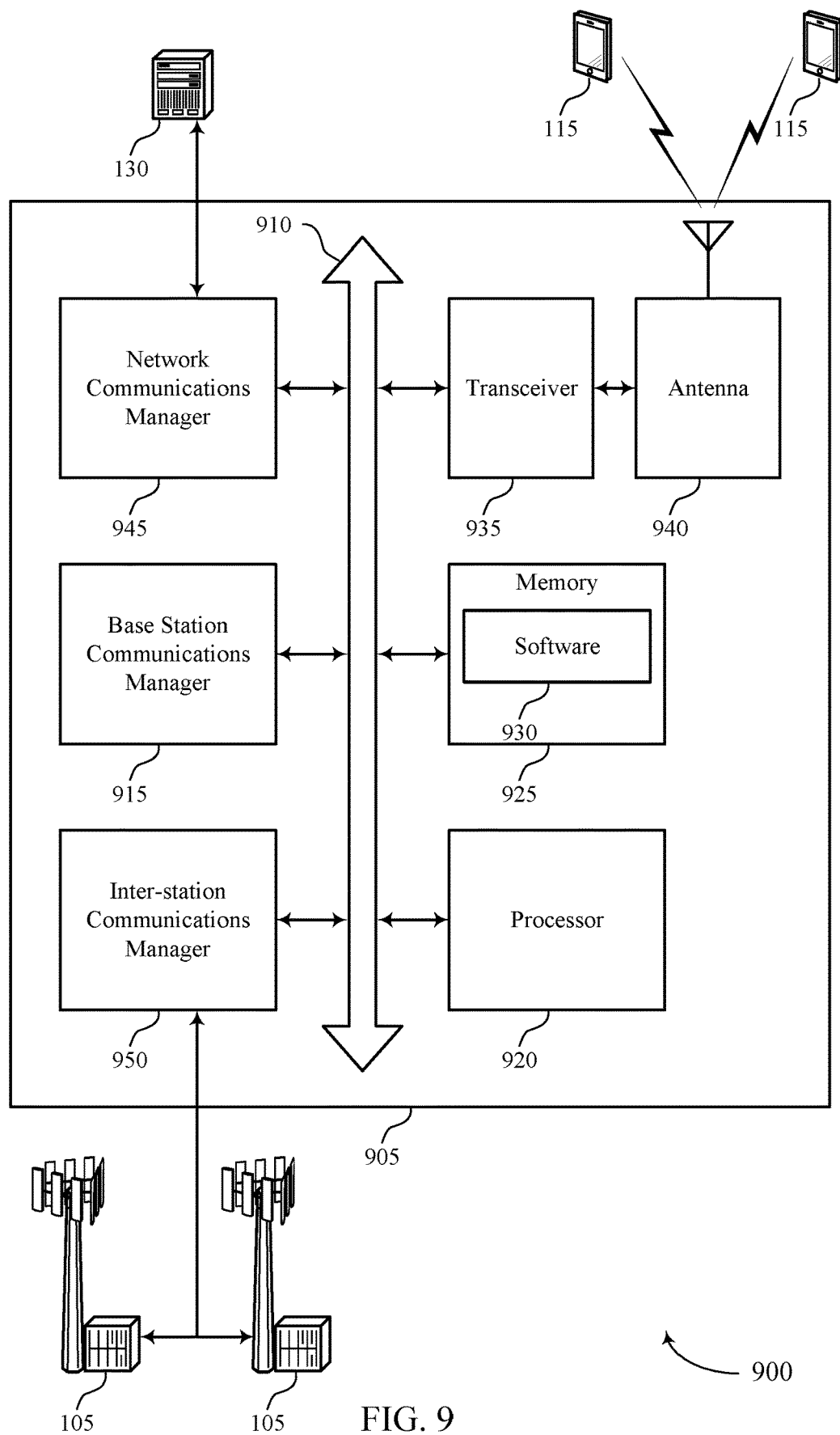
FIG. 9 illustrates a block diagram of a system including a base station that supports requesting resource allocation in a wireless backhaul network in accordance with aspects of the present disclosure.

FIG. 9 shows a diagram of a system 900 including a device 905 that supports requesting resource allocation in a wireless backhaul network in accordance with aspects of the present disclosure. Device 905 may be an example of or include the components of wireless device 605, wireless device 705, a wireless node, or a base station 105 as described herein. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting requesting resource allocation in a wireless backhaul network).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware or software operation such as the interaction with peripheral components or devices.

Software 930 may include code to implement aspects of the present disclosure, including code to support requesting resource allocation in a wireless backhaul network. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
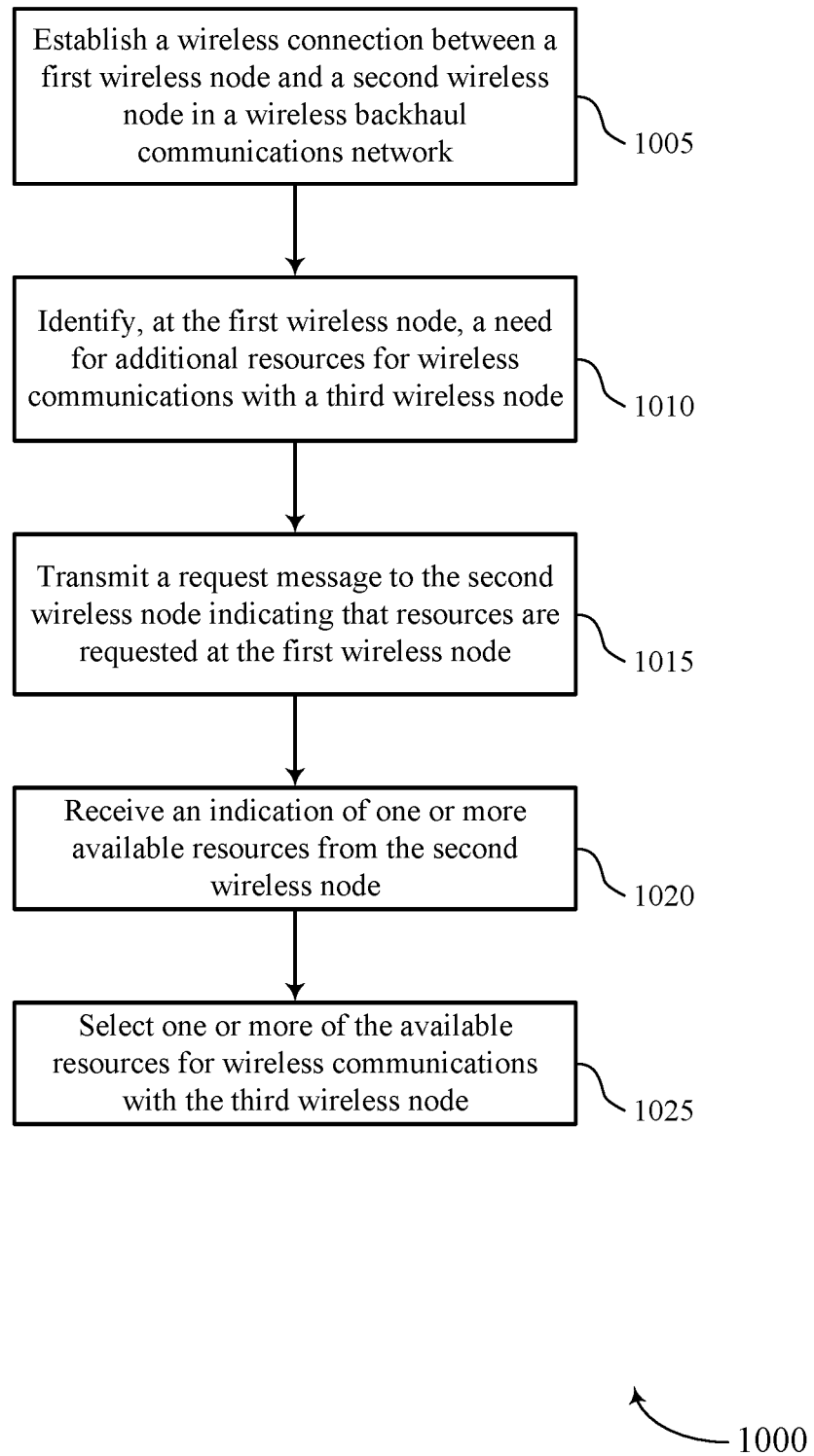
FIGS. 10 through 12 illustrate methods for requesting resource allocation in a wireless backhaul network in accordance with aspects of the present disclosure.

FIG. 10 shows a flowchart illustrating a method 1000 for requesting resource allocation in a wireless backhaul network in accordance with aspects of the present disclosure. The operations of method 1000 may be implemented by a UE 115 or base station 105 or its components as described herein. For example, the operations of method 1000 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005 the UE 115 or base station 105 may establish a wireless connection between a first wireless node and a second wireless node in a wireless backhaul communications network. The operations of block 1005 may be performed according to the methods described herein. In certain examples, aspects of the operations of block 1005 may be performed by a connection manager as described with reference to FIGS. 5 through 7.

At block 1010 the UE 115 or base station 105 may identify, at the first wireless node, a need for additional resources for wireless communications with a third wireless node. The operations of block 1010 may be performed according to the methods described herein. In certain examples, aspects of the operations of block 1010 may be performed by a resource requirement manager as described with reference to FIGS. 5 through 7.

At block 1015 the UE 115 or base station 105 may transmit a request message to the second wireless node indicating that resources are requested at the first wireless node. The operations of block 1015 may be performed according to the methods described herein. In certain examples, aspects of the operations of block 1015 may be performed by a resource request manager as described with reference to FIGS. 5 through 7.

At block 1020 the UE 115 or base station 105 may receive an indication of one or more available resources from the second wireless node. The operations of block 1020 may be performed according to the methods described herein. In certain examples, aspects of the operations of block 1020 may be performed by a resource request manager as described with reference to FIGS. 5 through 7.

At block 1025 the UE 115 or base station 105 may select one or more of the available resources for wireless communications with the third wireless node. The operations of block 1025 may be performed according to the methods described herein. In certain examples, aspects of the operations of block 1025 may be performed by a resource selection manager as described with reference to FIGS. 5 through 7.

Figure 11:
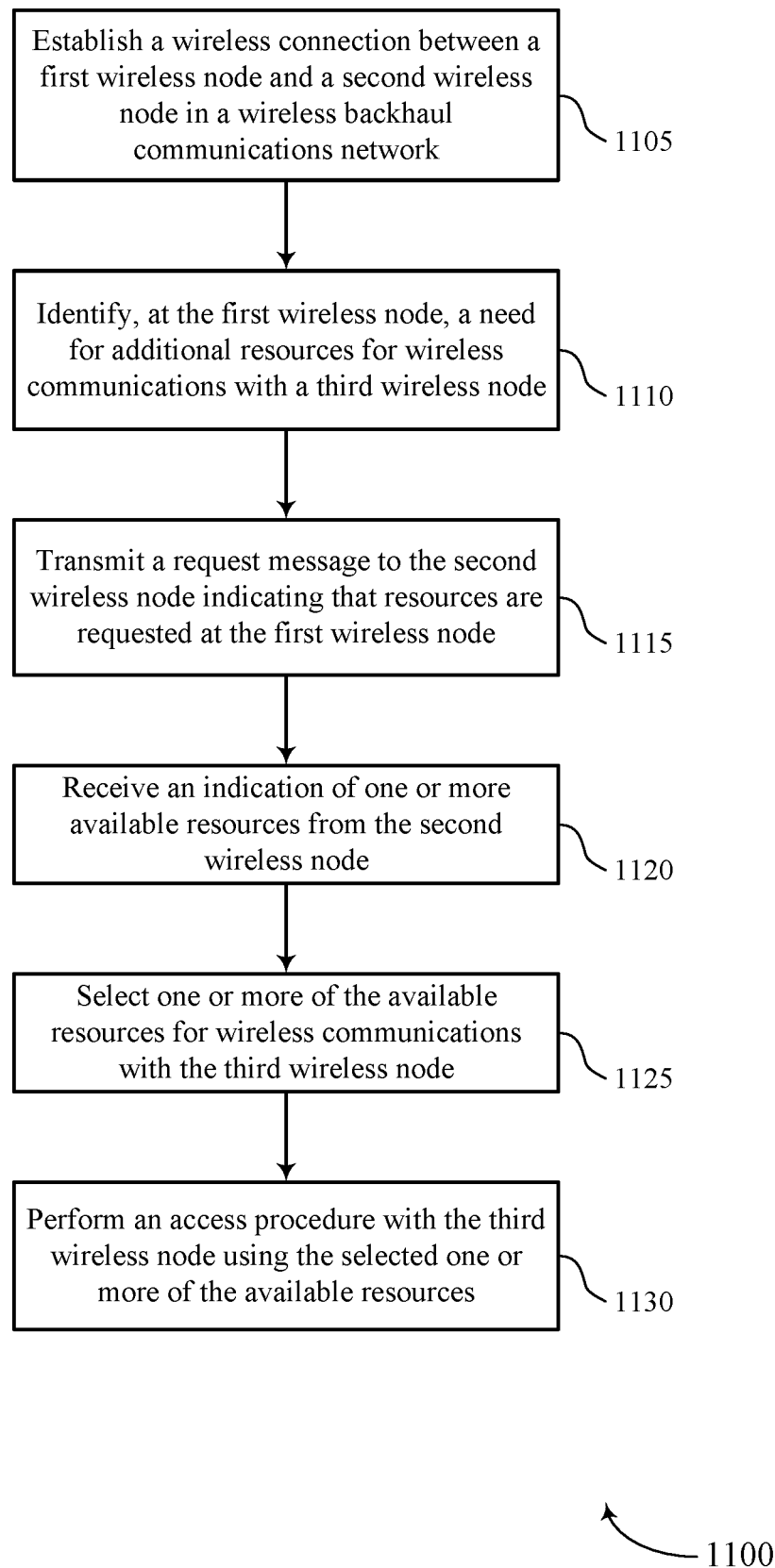

FIG. 11 shows a flowchart illustrating a method 1100 for requesting resource allocation in a wireless backhaul network in accordance with aspects of the present disclosure. The operations of method 1100 may be implemented by a UE 115 or base station 105 or its components as described herein. For example, the operations of method 1100 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may establish a wireless connection between a first wireless node and a second wireless node in a wireless backhaul communications network. The operations of block 1105 may be performed according to the methods described herein. In certain examples, aspects of the operations of block 1105 may be performed by a connection manager as described with reference to FIGS. 5 through 7.

At block 1110 the UE 115 or base station 105 may identify, at the first wireless node, a need for additional resources for wireless communications with a third wireless node. The operations of block 1110 may be performed according to the methods described herein. In certain examples, aspects of the operations of block 1110 may be performed by a resource requirement manager as described with reference to FIGS. 5 through 7.

At block 1115 the UE 115 or base station 105 may transmit a request message to the second wireless node indicating that resources are requested at the first wireless node. The operations of block 1115 may be performed according to the methods described herein. In certain examples, aspects of the operations of block 1115 may be performed by a resource request manager as described with reference to FIGS. 5 through 7.

At block 1120 the UE 115 or base station 105 may receive an indication of one or more available resources from the second wireless node. The operations of block 1120 may be performed according to the methods described herein. In certain examples, aspects of the operations of block 1120 may be performed by a resource request manager as described with reference to FIGS. 5 through 7.

At block 1125 the UE 115 or base station 105 may select one or more of the available resources for wireless communications with the third wireless node. The operations of block 1125 may be performed according to the methods described herein. In certain examples, aspects of the operations of block 1125 may be performed by a resource selection manager as described with reference to FIGS. 5 through 7.

At block 1130 the UE 115 or base station 105 may perform an access procedure with the third wireless node using the selected one or more of the available resources. The operations of block 1130 may be performed according to the methods described herein. In certain examples, aspects of the operations of block 1130 may be performed by a access procedure manager as described with reference to FIGS. 5 through 7.

Figure 12:
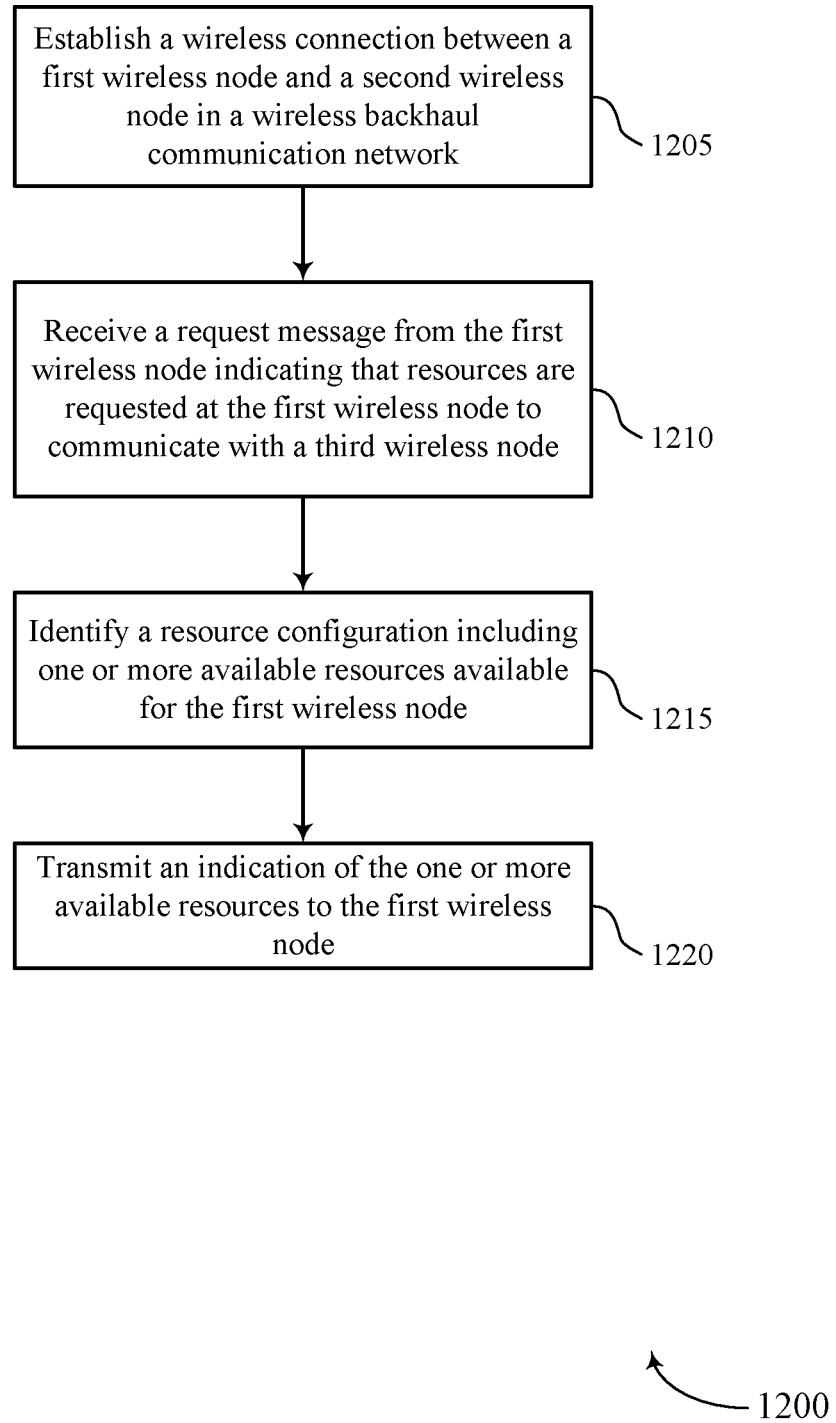

FIG. 12 shows a flowchart illustrating a method 1200 for requesting resource allocation in a wireless backhaul network in accordance with aspects of the present disclosure. The operations of method 1200 may be implemented by a UE 115 or base station 105 or its components as described herein. For example, the operations of method 1200 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may establish a wireless connection between a first wireless node and a second wireless node in a wireless backhaul communication network. The operations of block 1205 may be performed according to the methods described herein. In certain examples, aspects of the operations of block 1205 may be performed by a connection manager as described with reference to FIGS. 5 through 7.

At block 1210 the UE 115 or base station 105 may receive a request message from the first wireless node indicating that resources are requested at the first wireless node to communicate with a third wireless node. The operations of block 1210 may be performed according to the methods described herein. In certain examples, aspects of the operations of block 1210 may be performed by a resource request manager as described with reference to FIGS. 5 through 7.

At block 1215 the UE 115 or base station 105 may identify a resource configuration including one or more available resources available for the first wireless node. The operations of block 1215 may be performed according to the methods described herein. In certain examples, aspects of the operations of block 1215 may be performed by a resource request manager as described with reference to FIGS. 5 through 7.

At block 1220 the UE 115 or base station 105 may transmit an indication of the one or more available resources to the first wireless node. The operations of block 1220 may be performed according to the methods described herein. In certain examples, aspects of the operations of block 1220 may be performed by a resource request manager as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless node, comprising:
   establishing a wireless connection between the first wireless node and a second wireless node in a wireless backhaul communications network;
   receiving a signal from a third wireless node that is available for communications via the wireless backhaul communications network, wherein the signal comprises a synchronization signal, a random access message, a reference signal, system information, or any combination thereof;
   identifying, at the first wireless node, a need for additional resources for performing wireless backhaul communications with the third wireless node based at least in part on receiving the signal from the third wireless node;
   transmitting, by the first wireless node, a request message to the second wireless node indicating that resources are requested at the first wireless node for performing wireless backhaul communications between the first wireless node and the third wireless node;
   receiving an indication of one or more available resources from the second wireless node;
   selecting one or more of the available resources for performing an access procedure with the third wireless node to join the wireless backhaul communications network; and
   allocating resources for one or more other wireless nodes, wherein the resources for the one or more other wireless nodes are at least partially different from the available resources.

2. The method of claim 1, further comprising:
   transmitting, by the first wireless node, a message to the second wireless node indicating the selected one or more of the available resources for performing wireless backhaul communications between the first wireless node and the third wireless node.

3. The method of claim 1, further comprising:
   transmitting a message to the third wireless node indicating the selected one or more of the available resources.

4. The method of claim 1, further comprising:
   performing the access procedure with the third wireless node using the selected one or more of the available resources, wherein the access procedure comprises at least one of a synchronization procedure, a random access procedure, a paging procedure, a system information procedure, a reference signal procedure, or any combination thereof.

5. The method of claim 4, wherein:
the paging procedure comprises identifying a paging occasion associated with a target wireless node, wherein the selected one or more of the available resources is based at least in part on the paging occasion.

6. The method of claim 1, further comprising:
receiving a random access channel (RACH) preamble message from the third wireless node based at least in part on receiving the signal from the third wireless node, wherein the request message is transmitted in response to receiving the RACH preamble message; and
transmitting a random access response (RAR) message using the resources selected from the one or more available resources.

7. The method of claim 1,
wherein the the request message is transmitted in response to receiving the synchronization signal, the reference signal, the system information signal, or any combination thereof; the method further comprising:
transmitting a random access channel (RACH) preamble message using the resources selected from the one or more available resources.

8. The method of claim 1, further comprising:
establishing a wireless communication backhaul link with the third wireless node using the resources selected from the one or more available resources.

9. The method of claim 1, further comprising:
determining that the third wireless node is available for multiple-user multiple-input/multiple-output (MU-MIMO) wireless communications; and
performing MU-MIMO wireless communications with the third wireless node using the additional resources.

10. The method of claim 1, further comprising:
configuring the request message to convey an indication of at least one of the requested resources, or a resource available at the first wireless node, or a subset of resources from an available set of resources at the first wireless node.

11. The method of claim 10, further comprising:
identifying the requested resources based on at least one of a resource schedule of a plurality of wireless nodes, a capability configuration of the plurality of wireless nodes, a communication requirement of the plurality of wireless nodes, a second signal received from the plurality of wireless nodes, a channel state information or beam measurement corresponding to the plurality of wireless nodes, or any combination thereof.

12. The method of claim 11, wherein:
the request message comprises information associated with at least one of the resource schedule of the plurality of wireless nodes, the capability configuration of the plurality of wireless nodes, the communication requirement of the plurality of wireless nodes, the second signal received from the plurality of wireless nodes, the channel state information or beam measurement corresponding to the plurality of wireless nodes, or any combination thereof.

13. The method of claim 10, wherein:
the requested resources comprise at least one of a periodic resource, a resource associated with a time interval, a user-plane resource, a control-plane resource, or any combination thereof.

14. The method of claim 1, wherein:
one or more of the available resources comprise a time division multiplexing resource, a frequency division multiplexing resource, a code division multiplexing resource, a space division multiplexing resource, or any combination thereof.

15. A method for wireless communication, comprising:
establishing a wireless connection between a first wireless node and a second wireless node in a wireless backhaul communication network;
receiving a request message from the first wireless node indicating that resources are requested at the first wireless node for performing wireless backhaul communications between the first wireless node and a third wireless node, wherein the resources are requested at the first wireless node based at least in part on signaling between the first wireless node and the third wireless node;
identifying a resource configuration including one or more available resources available for the first wireless node based at least in part on at least one of a resource schedule of a plurality of wireless nodes, a capability configuration of the plurality of wireless nodes, a communication requirement of the plurality of wireless nodes, a second signal received from the plurality of wireless nodes, or any combination thereof; and
transmitting an indication of the one or more available resources to the first wireless node.

16. The method of claim 15, further comprising:
coordinating with at least one of one or more other wireless nodes, or a central scheduler of a core network, or a combination thereof, to identify the resource configuration.

17. The method of claim 15, wherein:
the resource configuration is identified based at least in part on a channel state information or beam measurement corresponding to the plurality of wireless nodes.

18. An apparatus for wireless communication at a first wireless node, comprising:
a processor;
memory coupled with the processor; and instructions stored in the memory and operable, when executed by the processor, to cause the apparatus to:
establish a wireless connection between the first wireless node and a second wireless node in a wireless backhaul communications network;
receive a signal from a third wireless node that is available for communications via the wireless backhaul communications network, wherein the signal comprises a synchronization signal, a random access message, a reference signal, system information, or any combination thereof;
identify, at the first wireless node, a need for additional resources for performing wireless backhaul communications with the third wireless node based at least in part on receiving the signal from the third wireless node;
transmit, by the first wireless node, a request message to the second wireless node indicating that resources are requested at the first wireless node for performing wireless backhaul communications between the first wireless node and the third wireless node;

receive an indication of one or more available resources from the second wireless node;
select one or more of the available resources for performing an access procedure with the third wireless node to join the wireless backhaul communications network; and
allocate resources for one or more other wireless nodes, wherein the resources for the one or more other wireless nodes are at least partially different from the available resources.

19. The apparatus of claim 18, wherein the instructions are further executable by the processor to:
transmit, by the first wireless node, a message to the second wireless node indicating the selected one or more of the available resources for performing wireless backhaul communications between the first wireless node and the third wireless node.

20. The apparatus of claim 18, wherein the instructions are further executable by the processor to:
transmit a message to the third wireless node indicating the selected one or more of the available resources.

21. The apparatus of claim 18, wherein the instructions are further executable by the processor to:
perform the access procedure with the third wireless node using the selected one or more of the available resources, wherein the access procedure comprises at least one of a synchronization procedure, a random access procedure, a paging procedure, a system information procedure, a reference signal procedure, or any combination thereof.

22. The apparatus of claim 21, wherein:
the paging procedure comprises identifying a paging occasion associated with a target wireless node, wherein the selected one or more of the available resources is based at least in part on the paging occasion.

23. The apparatus of claim 22, wherein:
the synchronization procedure comprises communicating synchronization signals or communicating on a synchronization channel.

24. The apparatus of claim 18, wherein the instructions are further executable by the processor to:
receive a random access channel (RACH) preamble message from the third wireless node based at least in part on receiving the signal from the third wireless node, wherein the request message is transmitted in response to receiving the RACH preamble message; and
transmit a random access response (RAR) message using the resources selected from the one or more available resources.

25. The apparatus of claim 18,
wherein the request message is transmitted in response to receiving the synchronization signal, the reference signal, the system information signal, or any combination thereof; the instructions further executable by the processor to:
transmit a random access channel (RACH) preamble message using the resources selected from the one or more available resources.

26. The apparatus of claim 18, wherein the instructions are further executable by the processor to:
establish a wireless communication backhaul link with the third wireless node using the resources selected from the one or more available resources.

27. The apparatus of claim 18, wherein the instructions are further executable by the processor to:
determine that the third wireless node is available for multiple-user multiple-input/multiple-output (MU-MIMO) wireless communications; and
perform MU-MIMO wireless communications with the third wireless node using the additional resources.

28. The apparatus of claim 18, wherein the instructions are further executable by the processor to:
configure the request message to convey an indication of at least one of the requested resources, or a resource available at the first wireless node, or a subset of resources from an available set of resources at the first wireless node.

29. An apparatus for wireless communication, comprising:
a processor;
memory in electronic communication with the processor; and instructions stored in the memory and operable, when executed by the processor, to cause the apparatus to:
establish a wireless connection between a first wireless node and a second wireless node in a wireless backhaul communication network;
receive a request message from the first wireless node indicating that resources are requested at the first wireless node for performing wireless backhaul communications between the first wireless node and a third wireless node, wherein the resources are requested at the first wireless node based at least in signaling between the first wireless node and the third wireless node;
identify a resource configuration including one or more available resources available for the first wireless node based at least in part on at least one of a resource schedule of a plurality of wireless nodes, a capability configuration of the plurality of wireless nodes, a communication requirement of the plurality of wireless nodes, a second signal received from the plurality of wireless nodes, or any combination thereof; and
transmit an indication of the one or more available resources to the first wireless node.

30. The apparatus of claim 29, wherein the instructions are further executable by the processor to:
coordinate with one or more other wireless nodes to identify the resource configuration.

\* \* \* \* \*